(12) United States Patent
Fan

(10) Patent No.: US 9,382,127 B2
(45) Date of Patent: Jul. 5, 2016

(54) CATALYTIC CO₂ DESORPTION ON THE INTERFACE BETWEEN NAHCO₃ AND MULTIFUNCTIONAL NANOPOROUS TIO(OH)₂

(76) Inventor: Maohong Fan, Kent, IA (US)

( * ) Notice: Subject to any disclaimer, the term of this patent is extended or adjusted under 35 U.S.C. 154(b) by 0 days.

(21) Appl. No.: 13/469,895

(22) Filed: May 11, 2012

(65) Prior Publication Data

US 2013/0004394 A1 Jan. 3, 2013

Related U.S. Application Data

(60) Provisional application No. 61/518,854, filed on May 11, 2011.

(51) Int. Cl.
B01D 53/48 (2006.01)
C01G 23/04 (2006.01)
(Continued)

(52) U.S. Cl.
CPC ............... *C01G 23/04* (2013.01); *B01D 53/62* (2013.01); *B01D 53/96* (2013.01); *B01J 20/043* (2013.01); *B01J 20/06* (2013.01); *B01J 20/28057* (2013.01); *B01J 20/28071* (2013.01); *B01J 20/28083* (2013.01); *B01J 20/3078* (2013.01); *B01J 20/3085* (2013.01); *B01J 20/3204* (2013.01); *B01J 20/3236* (2013.01); *B01D 2251/304* (2013.01); *B01D 2255/2065* (2013.01); *B01D 2255/2092* (2013.01); *B01D 2255/20707* (2013.01); *B01D 2255/20738* (2013.01); *B01D 2257/504* (2013.01); *B01J 21/063* (2013.01); *B01J 27/232* (2013.01); *B01J 2220/42* (2013.01); *C01P 2002/72* (2013.01); *C01P 2002/82* (2013.01); *C01P 2002/88* (2013.01); *C01P 2004/03* (2013.01);

(Continued)

(58) Field of Classification Search
None
See application file for complete search history.

(56) References Cited

U.S. PATENT DOCUMENTS 5,096,680 A * 3/1992 Lindbauer et al. ............ 423/229
5,352,646 A * 10/1994 Blanchard et al. ............ 502/263

(Continued)

OTHER PUBLICATIONS

Zou Yong, Vera Mata, Alirio E. Rodriues, "Adsorption of carbon dioxide at high temperature—a review", Separation and Purification Technology 26 (2002) 195-205.*

(Continued)

*Primary Examiner* — Jonathan Johnson
*Assistant Examiner* — Anita Nassiri Motlagh
(74) *Attorney, Agent, or Firm* — Aspire IP; Scott J. Hawranek

(57) ABSTRACT

CO₂ capture from flue gas is a costly procedure, usually due to the energy required for regeneration of the capture medium. One potential medium which could reduce such an energy consumption, however, is Na₂CO₃. It has been well studied as a sorbent, and it is understood that the theoretical energy penalty of use of Na₂CO₃ for CO₂ separation is low, due to the relatively low heat of reaction and low heat capacity of the material. While it offers some advantages over other methods, its primary downfall is the slow reaction with CO₂ during adsorption and the slow Na₂CO₃ regeneration process. An aspect of the invention relates to a catalyst to improve reaction kinetics, and more particularly to a catalyst to improve reaction kinetics for CO₂ desorption and CO₂ adsorption.

20 Claims, 5 Drawing Sheets

(51) Int. Cl.
| | |
|---|---|
| B01D 53/62 | (2006.01) |
| B01D 53/96 | (2006.01) |
| B01J 20/04 | (2006.01) |
| B01J 20/06 | (2006.01) |
| B01J 20/28 | (2006.01) |
| B01J 20/30 | (2006.01) |
| B01J 20/32 | (2006.01) |
| B01J 21/06 | (2006.01) |
| B01J 27/232 | (2006.01) |

(52) U.S. Cl.
CPC ............... Y02C 10/04 (2013.01); Y02C 10/08 (2013.01); Y02P 20/152 (2015.11)

(56) References Cited

U.S. PATENT DOCUMENTS

| | | | |
|---|---|---|---|
| 7,228,862 B2* | 6/2007 | Hajaligol et al. ............. | 131/364 |
| 2001/0014648 A1* | 8/2001 | Hums et al. .................... | 502/350 |
| 2001/0046455 A1* | 11/2001 | Suga et al. ..................... | 422/177 |
| 2002/0077249 A1* | 6/2002 | Schlegel et al. ............... | 502/328 |
| 2002/0115563 A1* | 8/2002 | Blanchard et al. ............ | 502/304 |
| 2007/0167319 A1* | 7/2007 | Shiratori et al. .............. | 502/304 |
| 2008/0119356 A1* | 5/2008 | Ryu et al. ...................... | 502/400 |
| 2008/0271601 A1* | 11/2008 | Schlegel et al. ................. | 95/90 |
| 2009/0022643 A1* | 1/2009 | Nochi et al. ............. | 423/244.02 |

OTHER PUBLICATIONS

Mohamad Ridzuan Noordin and Kong Yong Liew, "Synthesis of Alumina Nanofibers and Composites", Nanofibers, Ashok Kumar (Ed.), ISBN 978-953-7619-86-2, pp. 438, Feb. 2010, InTech.*
Prof. Panias Dimitrios, "Synthesis of nano γ-AlOOH from aluminate solutions for catalytic applications", National Technical University of Athens, SLM 2008, Belgrade.*
Bărbulescu, "Synthesis and thermal analysis of titanium oxyhydrate ultrafine powders," Rev. Roum. Chim., 19, (1974), pp. 833-838.
Benson et al., "$CO_2$ absorption employing hot potassium carbonate solutions," Chem. Eng. Prog., 50, (1954), pp. 356-364.
Benson et al., "Improved process for $CO_2$ absorption uses hot carbonate solutions," Chem. Eng. Prog., 52, (1956), pp. 433-438.
Maohong et al., "Use of multifunctional nanoporous $TiO(OH)_2$ for catalytic $NaHCO_3$ decomposition-eventually for $Na_2CO_3/NaHCO_3$ based $CO_2$ separation technology," Separation and Purification Technology, 80, (2011), pp. 364-374.
Maohong et al., "Use of Nanoporous FeOOH as a Catalytic Support for $NaHCO_3$ Decomposition Aimed at Reduction of Energy Requirement of $Na_2CO_3/NaHCO_3$ Based $CO_2$ Separation Technology," J. Phys. Chem. C, 2011, 115 pp. 15532-15554.
Mimura et al., "Recent development on flue gas $CO_2$ recovery technology," Greenhouse Gas Control Technol., Proc. Int. Conf., 6th, 2, (2003), pp. 1057-1067.
Okunev et al., "Sorption of carbon dioxide by the composite sorbent potassium carbonate in porous matrix," Russ. Chem. Bull., 52, (2003), pp. 359-363.
Park et al., "Carbonate kinetics of potassium carbonate by carbon dioxide," J. Ind. Eng. Chem., 12, (2006), pp. 522-530.
Green et al., "Capture of carbon dioxide from flue gas using solid regenerable sorbents," Int. J. Environ. Technol. Manage., 4, (2004), pp. 53-67.
Hoffman et al., "Factors in reactor design for dioxide with solid, regenerable sorbents," in Proceedings of the International Technical Conference on Coal Utilization & Fuel Systems, 2, (2008), pp. 1139-1150.
Aaron et al., "Separation of $CO_2$ from flue gas: a review," Sep. Sci. Technol., 40, (2005), pp. 321-348.
Ballirano et al., "Thermal behavior of natrite $Na_2CO_3$ in the 303-1013 K thermal range," Phase Transitions, 84, (2011), pp. 357-379.
Battezzati et al., "Formation and crystallization of amorphous Ni-Ti powders prepared by mechanical alloying," J. Less-Common Met., 145, (1988), pp. 301-308.

Cheng et al., "Optimizing preparation of the $TiO_2$ thin film reactor using the Taguchi method," Mater. Des., 31, (2010), pp. 1749-1751.
Cullinane et al., "Kinetics of carbon dioxide absorption into aqueous potassium carbonate and piperazine," Ind. Eng. Chem. Res, 45, (2006), pp. 2531-2545.
Duke et al., "Assessment of postcombustion carbon capture technologies for power generation," Front. Chem. Eng. China, 4, (2010), pp. 184-195.
Ghosh et al., "Absorption of carbon dioxide into aqueous potassium carbonate promoted by boric acid," Energy Procedia, 1, (2009), pp. 1075-1081.
Glasscock et al., "$CO_2$ absorption/desorption in mixtures of methyldiethanolamine with monoethanolamine or diethanolamine," Chem. Eng. Sci., 46, (1991), pp. 2829-2845.
Hasib-Ur-Rahman et al., "Ionic liquids for $CO_2$ capture—development and progress," Chem. Eng. Process., 49, (2010), pp. 313-322.
Hayashi et al., "Efficient recovery of carbon dioxide from flue gases of coal-fired power plants by cyclic fixed-bed operations over $K_2CO_3$-on-Carbon," Ind. Eng. Chem. Res., 37, (1998), pp. 185-191.
Heda et al., "A method of assessing solid state reactivity illustrated by thermal decomposition experiments on sodium bicarbonate," Thermochim. Acta, 255, (1995), pp. 255-272.
Herzog et al., "$CO_2$ capture, reuse, and storage technologies for mitigating global climate change," Technical Report No. DOE/DE-AF22-96PC01257, U.S. Department of Energy, Pittsburgh, PA, 1999.
Hicks et al., "Designing Adsorbents for $CO_2$ Capture from Flue Gas-Hyperbranched Aminosilicas Capable of Capturing $CO_2$ Reversibly," J. Am. Chem. Soc., 130, (2008), pp. 2902-2903.
Hirano et al., "Cyclic fixed-bed operation over $K_2CO_3$-on-carbon for the recovery of carbon dioxide under moist conditions," Bull. Chem. Soc. Jpn., 68, (1995), pp. 1030-1035.
Jankovic, "Kinetic analysis of isothermal decomposition process of sodium bicarbonate using the Weibull probability function—estimation of density distribution functions of the apparent activation energies," Metall. Mater. Trans. B, 40, (2009), pp. 712-726.
Karadas et al., "Review on the use of ionic liquids (IL) as alternative fluids for $CO_2$ capture and natural gas sweetening," Energy Fuels, 24, (2010), pp. 5817-5828.
Karuppuchamy et al., "Super-hydrophilic amorphous titanium dioxide thin film deposited by cathodic electrodeposition," Mater. Chem. Phys., 93, (2005), pp. 51-54.
Knuutila et al., Kinetics of the reaction of carbon dioxide with aqueous sodium and potassium carbonate solutions, Chem. Eng. Sci., 65 (2010) 6077-6088.
Koga et al., "Kinetic and morphological studies of the thermal dehydration of α-nickel(II) sulfate hexahydrate," J. Phys. Chem., 98, (1994), pp. 10521-10528.
Konieczny et al., "Catalyst development for thermocatalytic decomposition of methane to hydrogen," Int. J. Hydrogen Energy, 33, (2008), pp. 264-272.
Koradia et al., "Integrated approach to study the dehydration kinetcs of nitrofuantoin monohydrate," J. Pharm. Sci., 99, (2010), pp. 3966-3976.
Kostick et al., "U.S. Geological Survey Mineral Commodity Summaries," (2006), 150-151, http://minerals.usgs.gov/minerals/pubs/commodity/soda_ash/sodaamcs07.pdf, retrieved Apr. 6, 2011.
Kumar et al., "Conductivity study of polyethylene oxide (PEO) complexed with sodium bicarbonate," J. Mater. Sci., 42, (2007), pp. 5752-5755.
Lee et al., "$CO_2$ absorption and regeneration using Na and K based sorbents," Stud. Surf. Sci. Catal., 153, (2004), pp. 527-530.
Lee et al., "Dry potassium-based sorbents for $CO_2$ capture," Catal. Surv. Asia, 11, (2007), pp. 171-185.
Li et al., "Isomerization of αpinene over porous phosphate heterostructure materials: effects of porosity and acidity," Catalysis Letters, 131, (2009), pp. 560-565.
Li et al., "Structural changes of silica mesocellular foam supported amine-funcionalized $CO_2$ adsorbents upon exposure to steam," ACS Appl. Mater. Interfaces, 2, (2010), pp. 3363-3372.
Li et al., "Synthesis of $TiO_2$ nanorings and nanorods on TCO substrate by potentiostatic anodization of titanium powder," Cryst. Res. Technol., 46, (2011), pp. 413-416.

(56) References Cited

OTHER PUBLICATIONS

Liang et al., "Carbon dioxide capture using dry sodium-based sorbents," Energy Fuels, 18, (2004), pp. 569-575.
Liao et al., "Kinetics of absorption of carbon dioxide into aqueous solutions of monoethanolamine + Nmethyldiethanolamine," Chem. Eng. Sci., 57, (2002), pp. 4569-4582.
Ma et al., "Molecular basket sorbents for separation of CO2 and H2S from various gas steams," Am. Chem. Soc., 131, (2009), pp. 5777-5783.
Marinoni et al., "Kinetic study of mullite growth in sanitary-ware production by in situ HT-XRPD the influence of the filler/flux ratio," J. Eur. Ceram. Soc., 31, (2011), pp. 273-280.
Nickolov, "FTIR analysis of water structure and its significance in the flotation of sodium carbonate and sodium bicarbonate salts," Colloids Surf., A, 224, (2009), pp. 231-239.
Okunev et al., "Sorption of carbon dioxide from wet gases by K2CO3-in-porous matrix: influence of the matrix nature," React. Kinet. Catal. Lett., 71, (2000), pp. 355-362.
Park et al., "Sorption of carbon dioxide onto sodium carbonate," Sep. Sci. Technol., 41, (2006), pp. 2665-2684.
Plaza et al., "Modeling CO2 capture with aqueous monoethanolamine," International Journal of Greenhouse Gas Control, 4, (2010), pp. 161-166.
Popov et al., "Regularities of formation of nanocrystalline particles in titanium subgroup dioxides," Russ. J. Inorg. Chem., 55, (2010), pp. 1515-1520.
Ramachandran et al., "Kinetics of the absorption of CO2 into mixed aqueous loaded solutions of monoethanolamine and methyldiethanolamine," Ind. Eng. Chem. Res., 45, (2006), pp. 2608-2616.
Rose et al., "Structure and Mechanisms of Formation of FeOOH(NO3) Oligomers in the Early Stages of Hydrolysis," Langmuir, 13, (1997), pp. 3240-3246.
Rufino et al., "Characterization of lithium and sodium salts of poly(methacrylic acid) by FTIR and thermal analyses," Polym., 41, 2000, pp. 4213-4222.
Saqer et al., "Catalytic activity of supported platinum and metal oxide catalysts for toluene oxidation," Top. Catal., 52, (2009), pp. 517-527.
Sestak et al., "Study of the kinetics of the mechanism of solid state reaction at increasing temperatures," Thermochim. Acta, 3, (1971), pp. 1-12.
Sharonov et al., "Sorption of CO2 from humid gases on potassium carbonate supported by porous matrix," Russ. J. Appl. Chem., 74, (2001), pp. 409-413.
Shigemoto et al., "Material balance and energy consumption for CO2 Recover from moist flue gas employing K2CO3-onactivated carbon and its evaluation for practical adaptation," Energy Fuels, 20, (2006), pp. 721-726.
Shveikin et al., "Nano- and microagglomeration processes in the thermolysis of titanium and zirconium oxyhytrates," Inorg. Mater., 46, (2010), pp. 510-516.
Sjostrom et al., "Evaluation of solid sorbents as a retrofit technology for CO2 capture," Fuel, 89, (2010), pp. 1298-1306.
Stein, "IR and Mass Spectra.," NIST Chemistry WebBook; Mallard, W.G.; Linstrom, P.J., Eds. NIST Standard Reference Database No. 69; National Institute of Standards and Technology: Gaithersburg, MD, Feb. 2000, Sodium Carbonate (http://webbook.nist.gov) retrieved Apr. 4, 2011.
Stein, "IR and Mass Spectra.," NIST Chemistry WebBookMallard, W.G.Linstrom, P.J., Eds. NIST Standard Reference Database No. 69; National Institute of Standards and Technology: Gaithersburg, MD, Feb. 2000, Sodium Bicarbonate (http://webbook.nist.gov) Retrieved Apr. 4, 2011.
Stein, "IR and Mass Spectra.," NIST Chemistry WebBookMallard, W.G.Linstrom, P.J., Eds. NIST Standard Reference Database No. 69; National Institute of Standards and Technology: Gaithersburg, MD, Water (http://webbook.nist.gov) retrieved Apr. 4, 2011.
Subramanian et al., "Thermal decomposition kinetics of sodium bicarbonate by differential thermal analysis," J. Therm. Anal., 4, (1972), pp. 89-93.
Sui et al., "FTIR study on the formation of TiO2 nanostructures in supercritical CO2," J. Phys. Chem. B, 110, (2006), pp. 16212-16218.
Tanaka et al., "Kinetics and mechanism of the thermal dehydration of calcium oxalate monohydrate," Thermochim. Acta, 48, (1981), pp. 137-146.
Tanaka, "Comparison of thermal properties and kinetics of decompositions of NaHCO3 and KHCO3," J. Therm. Anal., 32, (1987), pp. 521-526.
Todinca et al., "Absorption with chemical reaction: evaluation of rate promoters effect on CO2 absorption in hot potassium carbonate solutions," Comput.-Aided Chem. Eng., 24, (2007), pp. 1065-1070.
White et al., "Separation and capture of CO2 from large stationary sources and sequestration in geological formations—coalbeds and deep saline aquifers," Air Waste Manage. Assoc., 53, (2003), pp. 645-715.
Wilska, "An X-ray diffraction study to determine the effect of the method of preparation upon the crystal structure of TiO2," Acta Chem. Scand., 8, (1954), pp. 1796-1801.
Wu et al., "Intrinsic kinetics of reoxidation reaction for a multicomponent molybdate catalyst by thermal analysis method," Catal. Commun., 10, (2009), pp. 1066-1069.
Yamada et al., "Kinetics of the thermal decomposition of sodium hydrogencarbonate evaluated by controlled rate evolved gas analysis coupled with thermogravimetry," Thermochim. Acta, 431, (2005), pp. 38-43.
Yang et al., "Progress in carbon dioxide separation and capture: a review," J. Environ. Sci., (Beijing, China), 20, (2008), pp. 14-27.
Zhao et al., "CO2 absorption using dry potassium-based sorbents with different supports," Energy Fuels, 23, (2009), pp. 4683-4687.
Zhao et al., "Study on the interaction between NOx and K2CO3 during CO2 absorption," Energy Fuels, 23, (2009), pp. 4768-4773.
Zhao et al., "Dispersion between Na2CO3 on $_\gamma$-Al2O3 and the threshold effect in flue-gas desulfurization," Fuel, vol. 81, 2002, pp. 1565-1568.

* cited by examiner

CATALYTIC CO$_2$ DESORPTION ON THE INTERFACE BETWEEN NAHCO$_3$ AND MULTIFUNCTIONAL NANOPOROUS TIO(OH)$_2$

This application claims the benefit of U.S. Provisional Patent Application No. 61/518,854, filed on May 11, 2011, which is hereby incorporated by reference for all purposes as if fully set forth herein.

GOVERNMENTAL SUPPORT CLAUSE

This invention was made with government support under DGE-0948027 awarded by the National Science Foundation. The government has certain rights in the invention.

BACKGROUND OF THE INVENTION

1. Field of the Invention

The invention generally relates to a catalyst to improve reaction kinetics, and more particularly to a catalyst to improve reaction kinetics for CO$_2$ desorption and CO$_2$ adsorption.

2. Discussion of the Related Art

Anthropogenic CO$_2$ is considered a major contributor to global warming. One of the primary sources of anthropogenic CO$_2$ is the flue gas from fossil fuel-fired power plants. As such, an ideal method of CO$_2$ abatement is to remove CO$_2$ from flue gas. Several techniques exist to accomplish this, including absorption using liquid solvents, membrane separation, cryogenic separation, and adsorption onto solid sorbents. Duke, et al., "Assessment of postcombustion carbon capture technologies for power generation," *Front. Chem. Eng. China*, 4, (2010), pp. 184-195; Li, et al., "Structural changes of silica mesocellular foam supported amine-funcionalized CO$_2$ adsorbents upon exposure to steam," *ACS Appl. Mater. Interfaces*, 2, (2010), pp. 3363-3372; Ma, et al., "Molecular basket sorbents for separation of CO$_2$ and H$_2$S from various gas steams," *Am. Chem. Soc.*, 131, (2009), pp. 5777-5783; Hicks, et al., Designing adsorbents for CO$_2$ capture from flue gas-hyperbranched aminosilicas capable of capturing CO$_2$ reversibly," *J. Am. Chem. Soc.*, 130, (2008), pp. 2902-2903; Yang, et al., "Progress in carbon dioxide separation and capture: a review," *J. Environ. Sci.*, (Beijing, China), 20, (2008), pp. 14-27; Aaron, et al., "Separation of CO$_2$ from flue gas: a review," *Sep. Sci. Technol.*, 40, (2005), pp. 321-348; Mimura, et al., "Recent development on flue gas CO$_2$ recovery technology," *Greenhouse Gas Control Technol., Proc. Int. Conf, 6$^{th}$*, 2, (2003), pp. 1057-1067; White, et al., "Separation and capture of CO$_2$ from large stationary sources and sequestration in geological formations—coalbeds and deep saline aquifers," *Air Waste Manage. Assoc.*, 53, (2003), pp. 645-715; Herzog, et al., "CO$_2$ capture, reuse, and storage technologies for mitigating global climate change," *Technical Report No. DOE/DE-AF22-96PC01257, U.S. Department of Energy*, Pittsburgh, Pa., 1999, each of which is hereby incorporated by reference as if fully set forth herein. Each of these techniques has its own advantages and disadvantages.

Therefore, a need exists to improve compositions, reaction kinetics, and method of using the same.

SUMMARY OF THE INVENTION

Accordingly, the invention is directed to hermetic packaging and method of forming the same that substantially obviates one or more of the problems due to limitations and disadvantages of the related art.

An advantage of the invention is to provide a catalyst to improve reaction kinetics of adsorbtion and desorption of CO$_2$.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the invention relates to a catalyst composition for desorption or adsorption including MOOH, where M is a trivalent metallic cation.

In another aspect of the invention is directed towards a catalyst composition for desorption or adsorption including NO(OH)$_2$, where N is a tetravalent metallic cation.

Still yet another aspect of the invention is towards a catalyst composition for CO$_2$ sorption with carbonates including NO(OH)$_2$, where N is a tetravalent metallic cation and MOOH, where M is a trivalent metallic cation.

Yet still another aspect of the invention is directed towards a method of CO$_2$ adsorption including a catalyst as described herein.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
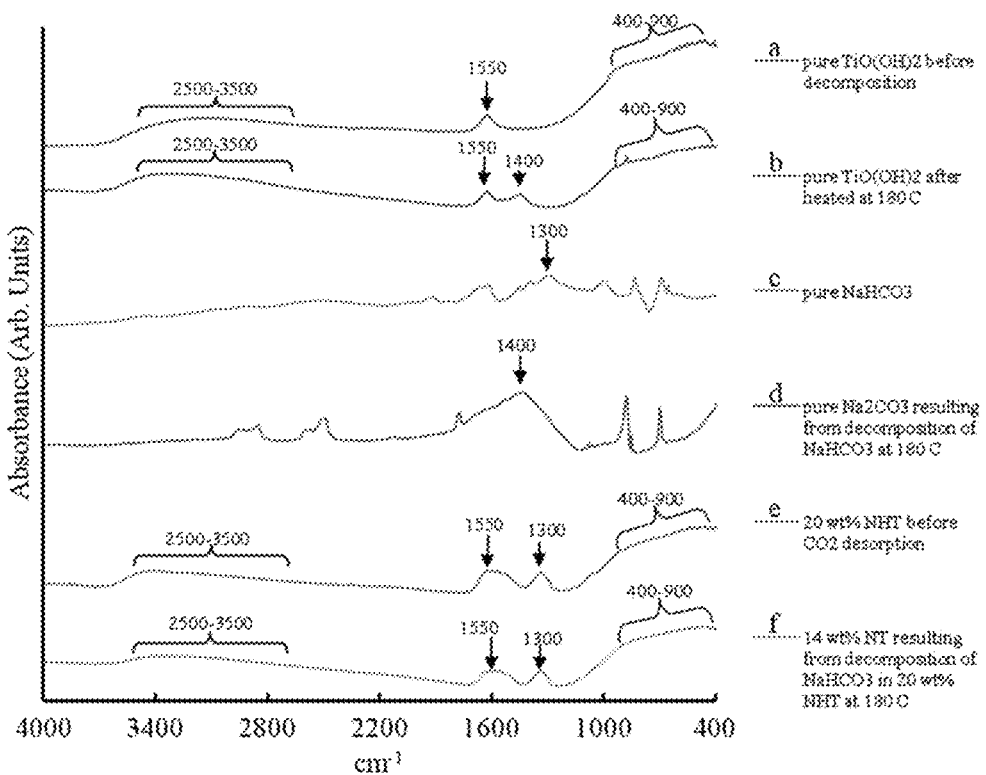
FIG. 1 shows a FT-IR spectra of pure TiO(OH)$_2$, pure NaHCO$_3$, pure Na$_2$CO$_3$, and freshly prepared and decomposed 20 wt % NHT samples according to an example of the invention.

The most developed and commercially viable CO$_2$ separation technology is stripping CO$_2$ with aqueous amine solutions. Due to its many advantages, this technology has been commonly used to remove $CO_2$ and other acid gases as impurities from natural gas for over 60 years. Duke, et al., "Assessment of postcombustion carbon capture technologies for power generation," *Front. Chem. Eng. China,* 4, (2010), pp. 184-195; Yang, et al., "Progress in carbon dioxide separation and capture: a review," *J. Environ. Sci.,* (Beijing, China), 20, (2008), pp. 14-27, each of which is hereby incorporated by reference as if fully set forth herein.

However, study of its use for $CO_2$ separation from flue gas is fairly recent. The solvents have typically been designed for low temperature absorption, below the temperatures of typical flue gas, and as such, have poor thermal stability Id.; Hasib-ur-Rahman, et al., "Ionic liquids for $CO_2$ capture—development and progress," *Chem. Eng. Process.,* 49, (2010), pp. 313-322, each of which is hereby incorporated by reference. The amines can not only be poisoned by common impurities in the flue gas, such as $SO_X$ and $NO_x$ gases, but also oxygen. Duke, et al., "Assessment of postcombustion carbon capture technologies for power generation," *Front. Chem. Eng. China,* 4, (2010), pp. 184-195; Yang, et al., "Progress in carbon dioxide separation and capture: a review," *J. Environ. Sci.,* (Beijing, China), 20, (2008), pp. 14-27, each of which is hereby incorporated by reference as if fully set forth herein.

Some of the amines can be lost through evaporation to the gas stream during use, thus requiring replacement. Hasib-ur-Rahman, et al., "Ionic liquids for $CO_2$ capture—development and progress," *Chem. Eng. Process.,* 49, (2010), pp. 313-322; Karadas, et al., "Review on the use of ionic liquids (IL) as alternative fluids for $CO_2$ capture and natural gas sweetening," *Energy Fuels,* 24, (2010), pp. 5817-5828, each of which is hereby incorporated by reference as if fully set forth herein.

Moreover, amines are toxic and corrosive, and therefore are pollutants to the environment. Because of their corrosive properties, amines typically need to be diluted with water; with more water present, more energy is required for desorption of $CO_2$. This dilution also lowers the $CO_2$ capture capacities of amine solutions. Duke, et al., "Assessment of postcombustion carbon capture technologies for power generation," *Front. Chem. Eng. China,* 4, (2010), pp. 184-195; Yang, et al., "Progress in carbon dioxide separation and capture: a review," *J. Environ. Sci.,* (Beijing, China), 20, (2008), pp. 14-27; Hasib-ur-Rahman, et al., "Ionic liquids for $CO_2$ capture—development and progress," *Chem. Eng. Process.,* 49, (2010), pp. 313-322; Karadas, et al., "Review on the use of ionic liquids (IL) as alternative fluids for $CO_2$ capture and natural gas sweetening," *Energy Fuels,* 24, (2010), pp. 5817-5828, each of which is hereby incorporated by reference as if fully set forth herein.

In an alternative liquid absorption process, $CO_2$ is captured by an aqueous alkali metal carbonate solution via the reaction as follows:

$$M_2CO_3 + CO_2 + H_2O \leftrightarrow 2MHCO_3 \qquad R1$$

where M represents the alkali metal, primarily sodium and potassium. In this reversible reaction, carbonation occurs at temperatures typical of flue gas, 50-80° C., and decarbonation is achieved by boiling the solution. Knuutila, et al., "Kinetics of the reaction of carbon dioxide with aqueous sodium and potassium carbonate solutions," Chem. Eng. Sci. 65 (2010) 6077-6088; Ghosh, et al., "Absorption of carbon dioxide into aqueous potassium carbonate promoted by boric acid," *Energy Procedia,* 1, (2009), pp. 1075-1081; Zhao, et al., "Study on the interaction between $NO_x$ and $K_2CO_3$ during $CO_2$ absorption," *Energy Fuels,* 23, (2009), pp. 4768-4773; Todinca, et al., "Absorption with chemical reaction: evaluation of rate promoters effect on $CO_2$ absorption in hot potassium carbonate solutions," *Comput.-Aided Chem. Eng.,* 24, (2007), pp. 1065-1070; Cullinane, et at., "Kinetics of carbon dioxide absorption into aqueous potassium carbonate and piperazine," *Ind. Eng. Chem. Res,* 45, (2006), pp. 2531-2545; Green, et al., "Capture of carbon dioxide from flue gas using solid regenerable sorbents," *Int. J. Environ. Technol. Manage.,* 4, (2004), pp. 53-67; Benson, et al., "Improved process for $CO_2$ absorption uses hot carbonate solutions," *Chem. Eng. Prog.,* 52, (1956), pp. 433-438; Benson, et al., "$CO_2$ absorption employing hot potassium carbonate solutions," *Chem. Eng. Prog.,* 50, (1954), pp. 356-364, each of which is hereby incorporated by reference as if fully set forth herein.

When M is sodium, R1 can be specifically written as with the following reaction:

$$Na_2CO_3 + CO_2 + H_2O \leftrightarrow 2NaHCO_3 \qquad R2$$

Using alkali carbonates has several advantages include as alkali carbonates are readily available and less expensive, thereby reducing capital costs. Also, the alkali carbonates are thermally stable, e.g., $Na_2CO_3$ decomposes at temperatures over 800° C., while some amines, on the other hand, decompose at temperatures as low as 120° C. Duke, et al., "Assessment of postcombustion carbon capture technologies for power generation," *Front. Chem. Eng. China,* 4, (2010), pp. 184-195, which is hereby incorporated by reference.

Alkali carbonates, like most salts, have negligible vapor pressures, meaning that there will be little loss during $CO_2$ sorption or sorbent regeneration. Losses can occur through poisoning since $SO_2$ and $NO_x$ gases react irreversibly with the carbonate anion. Zhao, et al., "Study on the interaction between $NO_x$ and $K_2CO_3$ during $CO_2$ absorption," *Energy Fuels,* 23, (2009), pp. 4768-4773; Green, et al., "Capture of carbon dioxide from flue gas using solid regenerable sorbents," *Int. J. Environ. Technol. Manage.,* 4, (2004), pp. 53-67, each of which is hereby incorporation by reference as if fully set forth herein. Any losses that do occur, however, can be easily and inexpensively replaced, due to the ease of handling alkali carbonates and their low prices.

Therefore, it is surmised that using aqueous alkali carbonates has the potential to reduce energy consumption due to their lower reaction heats, but the associated reactions proceed slowly. Benson, et al., "Improved process for $CO_2$ absorption uses hot carbonate solutions," *Chem. Eng. Prog.,* 52, (1956), pp. 433-438; Benson, et al., "$CO_2$ absorption employing hot potassium carbonate solutions," *Chem. Eng. Prog.,* 50, (1954), pp. 356-364, each of which is hereby incorporated by reference as if fully set forth herein.

piperazine and boric acid have been used to accelerate $CO_2$ sorption rates. However, the energies required to heat the aqueous solutions for $CO_2$ desorption or bicarbonates desorption are high, as with other liquid absorption processes. Todinca, et al., "Absorption with chemical reaction: evaluation of rate promoters effect on $CO_2$ absorption in hot potassium carbonate solutions," *Comput.-Aided Chem. Eng.,* 24, (2007), pp. 1065-1070; Cullinane, et al., "Kinetics of carbon dioxide absorption into aqueous potassium carbonate and piperazine," *Ind. Eng. Chem. Res,* 45, (2006), pp. 2531-2545, each of which is hereby incorporated by reference as if fully set forth herein.

Recently, there has been some development of solid sorbents for $CO_2$ separation in flue gas due to their higher $CO_2$ loading and lower heat capacities. Sjostrom, et al., "Evaluation of solid sorbents as a retrofit technology for $CO_2$ capture," *Fuel,* 89, (2010), pp. 1298-1306, which is hereby incorporated by reference as if fully set forth herein. The performances of some solid sorbents, zeolites in particular, are deteriorated by the presence of water in the flue gas because their porous structures are plugged with condensed water. Id. In addition, solid alkali carbonates need water for the capture of $CO_2$ according to R1. Pure carbonates and supported carbonates have been studied as solid chemical adsorbents, and it has been shown that some of them are stable and capable of removing 90% of $CO_2$ from a flue gas stream. Green, et al., "Capture of carbon dioxide from flue gas using solid regenerable sorbents," *Int. J. Environ. Technol. Manage.*, 4, (2004), pp. 53-67; Zhao, et al., "$CO_2$ absorption using dry potassium-based sorbents with different supports," *Energy Fuels,* 23, (2009), pp. 4683-4687; Lee, et al., "Dry potassium-based sorbents for $CO_2$ capture," *Catal. Surv. Asia,* 11, (2007), pp. 171-185; Park, et al., "Carbonate kinetics of potassium carbonate by carbon dioxide," *J. Ind. Eng. Chem.,* 12, (2006), pp. 522-530; Park, et al., "Sorption of carbon dioxide onto sodium carbonate," *Sep. Sci. Technol.,* 41, (2006), pp. 2665-2684; Shigemoto, et al., "Material balance and energy consumption for $CO_2$ Recover from moist flue gas employing $K_2CO_3$-on-activated carbon and its evaluation for practical adaptation," *Energy Fuels,* 20, (2006), pp. 721-726; Lee, et al., "$CO_2$ absorption and regeneration using Na and K based sorbents," Stud. Surf. Sci. Catal., 153, (2004), pp. 527-530; Liang, et al., "Carbon dioxide capture using dry sodium-based sorbents," *Energy Fuels,* 18, (2004), pp. 569-575; Okunev, et al., "Sorption of carbon dioxide by the composite sorbent potassium carbonate in porous matrix," *Russ. Chem. Bull.,* 52, (2003), pp. 359-363; Sharonov, et al., "Sorption of $CO_2$ from humid gases on potassium carbonate supported by porous matrix," *Russ. J. Appl. Chem.,* 74, (2001), pp. 409-413; Okunev, et al., "Sorption of carbon dioxide from wet gases by $K_2CO_3$-in-porous matrix: influence of the matrix nature," *React. Kinet. Catal. Lett.,* 71, (2000), pp. 355-362; Hayashi, et al., "Efficient recovery of carbon dioxide from flue gases of coal-fired power plants by cyclic fixed-bed operations over $K_2CO_3$-on-Carbon," *Ind. Eng. Chem. Res.,* 37, (1998), pp. 185-191; Hirano, et al., "Cyclic fixed-bed operation over $K_2CO_3$-on-carbon for the recovery of carbon dioxide under moist conditions," *Bull. Chem. Soc. Jpn.,* 68, (1995), pp. 1030-1035, each of which is hereby incorporated by reference as if fully set forth herein.

Impregnation of $K_2CO_3/Na_2CO_3$ onto a porous matrix improves the sorption capacity as well as the reaction rate, though to date most work in regards to kinetics has been qualitative. Zhao, et al., "$CO_2$ absorption using dry potassium-based sorbents with different supports," *Energy Fuels,* 23, (2009), pp. 4683-4687; Okunev, et al., "Sorption of carbon dioxide by the composite sorbent potassium carbonate in porous matrix," *Russ. Chem. Bull.,* 52, (2003), pp. 359-363; Okunev, et al., "Sorption of carbon dioxide from wet gases by $K_2CO_3$-in-porous matrix: influence of the matrix nature," *React. Kinet. Catal. Lett.,* 71, (2000), pp. 355-362, each of which is hereby incorporated by reference as if fully set forth herein.

As with aqueous solutions, $K_2CO_3$ has a higher sorption capacity for $CO_2$ and the reaction proceeds faster than with $Na_2CO_3$. Knuutila, et al., "Kinetics of the reaction of carbon dioxide with aqueous sodium and potassium carbonate solutions, *Chem. Eng. Sci.,* 65 (2010) 6077-6088. Park, et al., "Carbonate kinetics of potassium carbonate by carbon dioxide," *J. Ind. Eng. Chem.,* 12, (2006), pp. 522-530; Park, et al., "Sorption of carbon dioxide onto sodium carbonate," *Sep. Sci. Technol.,* 41, (2006), pp. 2665-2684; Lee, et al., "$CO_2$ absorption and regeneration using Na and K based sorbents," *Stud. Surf. Sci. Catal.,* 153, (2004), pp. 527-530, each of which is hereby incorporated by reference as if fully set forth herein.

One primary advantage of $Na_2CO_3$ over $K_2CO_3$, however, is its much lower price. In addition, $Na_2CO_3$ is more widely available, especially in Wyoming which has the world's largest deposit of trona and supplies about 90% of the soda ash in the US. Kostick, et al., "U.S. Geological Survey Mineral Commodity Summaries," (2006), 150-151, http://minerals.usgs.gov/minerals/pubs/commodity/soda_ash/sodaamcs07.pdf, retrieved Apr. 6, 2011, which is hereby incorporated by reference as if fully set forth herein. Therefore, $Na_2CO_3$ is still a promising $CO_2$ separation agent.

Sorption of $CO_2$ onto $Na_2CO_3$ is spontaneous under flue gas conditions. Because the sorption of $CO_2$ is spontaneous as with most other technologies is the most energy intensive step in the use of $Na_2CO_3$ for $CO_2$ capture is sorbent regeneration or $CO_2$ desorption, which, essentially, is that the sorbent is heated in order to shift the equilibrium of R2 towards the left. The kinetics of the decomposition reaction of pure $NaHCO_3$ have been studied extensively, but little information is available on the effect of a supporting material on $CO_2$ desorption or decomposition of pure $NaHCO_3$ on the surface of a supporting material. Yamada, et al., "Kinetics of the thermal decomposition of sodium hydrogencarbonate evaluated by controlled rate evolved gas analysis coupled with thermogravimetry," *Thermochim. Acta,* 431, (2005), pp. 38-43; Heda, et al., "A method of assessing solid state reactivity illustrated by thermal decomposition experiments on sodium bicarbonate," *Thermochim. Acta,* 255, (1995), pp. 255-272; Tanaka, "Comparison of thermal properties and kinetics of decompositions of $NaHCO_3$ and $KHCO_3$," *J. Therm. Anal.,* 32, (1987), pp. 521-526, each of which is hereby incorporated by reference as if fully set forth herein.

An ideal supporting material should not only maximize surface area of the $NaHCO_3/Na_2CO_3$ but also be a good catalyst to accelerate the desorption rate of $CO_2$ and consequently reduce the overall energy consumption of $CO_2$ separation. There is a need to reduce energy consumption for $CO_2$ desorption by avoiding or reducing water use. Aspects of the invention are directed towards new multifunctional materials which can support $Na_2CO_3/NaHCO_3$ and catalyze the desorption of $CO_2$ or decomposition of $NaHCO_3$ resulting from sorption of $CO_2$ with $Na_2CO_3$.

One embodiment of the invention is directed towards a supporting material that includes nanoporous titanium oxyhydrate, $TiO(OH)_2$. This supporting material can decompose into $TiO_2$ via the following reaction:

$$TiO(OH)_2 \leftrightarrow TiO_2 + H_2O \qquad \text{R3}$$

Reaction R3 begins to proceed towards the right side only at temperatures above 300° C., making it a stable supporting material of $Na_2CO_3$ for synthesis of solid sorbents for $CO_2$ capture from flue gas with $Na_2CO_3$. Popov, et al., "Regularities of formation of nanocrystalline particles in titanium subgroup dioxides," *Russ. J. Inorg. Chem.,* 55, (2010), pp. 1515-1520; Shveikin, et al., "Nano- and microagglomeration processes in the thermolysis of titanium and zirconium oxyhytrates," *Inorg. Mater.,* 46, (2010), pp. 510-516; Bărbulescu, "Synthesis and thermal analysis of titanium oxyhydrate ultrafine powders," *Rev. Roum. Chim.,* 19, (1974), pp. 833-838, each of which is hereby incorporated by reference as if fully set forth herein. This material may also be used as a catalyst. Li, et al., "Isomerization of α-pinene over porous phosphate heterostructure materials: effects of porosity and acidity," *Catalysis Letters,* 131, (2009), pp. 560-565, which is hereby incorporated by reference as if fully set forth herein.

The invention relates to a using a nanoporous $TiO(OH)_2$ as a multifunctional material as a catalyst for $Na_2CO_3$ based $CO_2$ separation process. The kinetic properties of catalytic desorption of $CO_2$ on the interface between $NaHCO_3$ and nanoporous $TiO(OH)_2$ are described herein. Maohong, et al., "Use of multifunctional nanoporous $TiO(OH)_2$ for catalytic $NaHCO_3$ decomposition-eventually for $Na_2CO_3$/$NaHCO_3$ based $CO_2$ separation technology," *Separation and Purification Technology*, 80, (2011), pp. 364-374, which is hereby incorporated by reference as if fully set forth herein.

In one embodiment, the invention relates to a catalyst composition for desorption or adsorption including MOOH, where M is a trivalent metallic cation. The trivalent metallic cation includes at least one of $Fe^{3+}$ and $Al^{3+}$. The catalyst composition also includes at least one of $NaHCO_3$ and $Na_2CO_3$. As shown in reaction of R2 herein the $NaHCO_3$ is used desorbing as the reaction goes from right to left and $Na_2CO_3$ is used in sorption as the reaction goes from left to right. Maohong, et al., "Use of Nanoporous FeOOH as a Catalytic Support for $NaHCO_3$ Decomposition Aimed at Reduction of Energy Requirement of $Na_2CO_3$/$NaHCO_3$ Based $CO_2$ Separation Technology," *J. Phys. Chem. C*, 2011, 115 pp. 15532-15554, which is hereby incorporated by reference as if fully set forth herein.

$NaHCO_3$ and $Na_2CO_3$ has a purity in a range from about 10% to about 100%. It is noted that other carbonates may also be used such as, $K_2CO_3$, $CaCO_3$, $MgCO_3$, combinations of the same, and the like. The weight percent of $NaHCO_3$/MOOH is in a range from about 20 wt % to about 95 wt %, more preferably the weight percent of $Na_2CO_3$/MOOH is in a range from about 20 wt % to about 95 wt %, and most preferably the weight percent of $Na_2CO_3$/MOOH is in a range of about 30% to about 80%.

Another embodiment is directed towards a catalyst composition for desorption or adsorption including $NO(OH)_2$, where N is a tetravalent metallic cation. The tetravalent metallic cation includes at least one of $Ti^{4+}$ and $Ce^{4+}$. In addition, the catalyst $NO(OH)_2$ includes at least one of $NaHCO_3$ and $Na_2CO_3$. The catalyst composition also includes at least one of $NaHCO_3$ and $Na_2CO_3$. As shown in reaction of R2 herein the $NaHCO_3$ is used desorbing as the reaction goes from right to left and $Na_2CO_3$ is used in sorption as the reaction goes from left to right. In this embodiment, $NaHCO_3$ has a purity in a range from about 80% to about 100% and the weight percent of $NaHCO_3$/MOOH is in a range from about 20 wt % to about 95 wt %.

Still another embodiment is directed towards a catalyst composition for desorption or adsorption including $Ti(OH)_2$ and at least one of $NaHCO_3$ and $Na_2CO_3$.

Yet another embodiment is directed towards a catalyst composition for $CO_2$ sorption with carbonates including $NO(OH)_2$, where N is a tetravalent metallic cation and MOOH, where M is a trivalent metallic cation. N and M are described herein and the $NO(OH)_2$/MOOH/Carbonates is in a range from about 5 wt % to about 95 wt %. In addition, ($NO(OH)_2$/MOOH)/Carbonates is in a range from about 5 wt % to about 95 wt %.

Another aspect of the invention is directed towards a method of $CO_2$ adsorption including a catalyst as described herein.

Another aspect of the invention relates to $CO_2$ capture from flue gas with catalytic decomposition of $NaHCO_3$. Nanoporous $TiO(OH)_2$ may be used as a catalytic support for a cyclic $Na_2CO_3$/$NaHCO_3$ based $CO_2$ capture process. $NaHCO_3$ supported on nanoporous $TiO(OH)_2$ is stable within the temperature range necessary for such a process, up to about 200° C. Also, $TiO(OH)_2$ has a catalytic effect on the decomposition of $NaHCO_3$, reducing the activation energy from about 80 kJ/mol to 36 kJ/mol. This significant drop in activation energy may translate into a much lower operating cost for regenerating $Na_2CO_3$. Finally, the reaction rate of $NaHCO_3$ decomposition, or $CO_2$ desorption, was observed to increase by as much as a factor of ten due to this decrease in activation energy.

Without intending to limit the scope of the invention, the following examples and embodiments illustrate how various aspects of the invention may be made and/or used.

Preparation of $NaHCO_3$/$Ti(OH)_2$

Pure $NaHCO_3$ was obtained from BDF Chemical. The pure $NaHCO_3$ used in decomposition tests was crushed and sieved such that only particles with diameters less 300 μm were used. $TiO(OH)_2$ was prepared in the lab with $Ti(OC_2H_5)_4$ from Acros containing 33-35 wt % $TiO_2$. The first preparation step was to add a predetermined quantity of $Ti(OC_2H_5)_4$ to water with the $H_2O$:$Ti(OC_2H_5)_4$ molar ratio being 26.3:1, followed by stirring the resultant mixture for 1 hr. Then, the $TiO(OH)_2$ precipitate was filtered, washed in deionized water, and dried at 120° C. for about 1.5 hrs.

$NaHCO_3$ was loaded on $TiO(OH)_2$ by mixing predetermined amounts of $TiO(OH)_2$ and $NaHCO_3$. The mass of each was determined by a specific weight percent of $NaHCO_3$ on the final product, $NaHCO_3$/$TiO(OH)_2$ (hereafter called NHT) 90 wt %, 50 wt %, and 20 wt % NHT samples (containing 90 wt %, 50 wt % and 20 wt % $NaHCO_3$, respectively), which were used for $CO_2$ desorption kinetic study. The specific NHT preparation steps included dissolving $NaHCO_3$ with sufficient distilled water to dissolve the $NaHCO_3$, stirring the aqueous $NaHCO_3$ and solid $TiO(OH)_2$ mixture at ambient conditions for at least 5 hrs, drying it under vacuum in a rotary evaporator at roughly 60° C., followed by crushing and sieving the resulting solid. Particles with diameters being less than 300 μm were used for testing. The $Na_2CO_3$ resulting from $NaHCO_3$ decomposition in NHT stayed on the surface of $TiO(OH)_2$ and the composite material $Na_2CO_3$/$TiO(OH)_2$ is hereafter named as NT.

Characterization

The nanoporous $TiO(OH)_2$, was tested for its stability and water sorption capability using a TA Instruments SDT Q600 thermogravimetric analyzer (TGA). The sample was heated at the rate of 5° C./min up to 200° C. This heating rate was chosen to keep an approximately uniform temperature throughout the sample. Brunauer, Emmet, and Teller (BET) analyses was completed with Micrometrics TriStar 3000 V 6.04 A device for $TiO(OH)_2$, 20 wt % NHT, and pure $NaHCO_3$ prior to $CO_2$ desorption or $NaHCO_3$ decomposition tests to determine the surface areas and pore characteristics of the materials. The NHT samples with 20 wt % $NaHCO_3$ were further characterized before and after decomposition at 100° C., 120° C., 140° C., 160° C., and 180° C. using Fourier transformed-infrared (FT-IR) spectroscopy, scanning electron microscopy (SEM), and X-ray diffraction (XRD). FT-IR data were collected with a Thermo Nicolet Magna-IR 760 spectrometer. SEM images were obtained with an FEI Quanta FEG 450 field emission scanning electron microscope. XRD data were achieved with a SCINTAG XDS2000 automated powder diffraction system equipped with a theta-theta goniometer and a solid state x-ray detector.

$CO_2$ Desorption or $NaHCO_3$ Decomposition

The kinetics of $CO_2$ desorption from NHT or $NaHCO_3$ decomposition were studied using a TA Instruments SDT Q600 TGA with an accuracy in weight measurement of ±1%. Each TGA test started with loading 20-100 mg samples into an alumina sample tray. The amount of the sample used for each test was determined based on the density of the sample tested. All the tested samples were heated at the rate of 20° C./min, the highest rate achievable with the TGA, to the desired temperature and then kept at the same temperature for at least 10 minutes. Argon at a flow rate of 0.1 L/min was used as a carrier gas for all the TGA tests.

Decomposition tests of pure $NaHCO_3$ with its particle diameters being less than 300 μm were done in the 100-200° C. range with 20° C. intervals. NHT samples were tested in the range of 100-140° C. with 10° C. intervals. The 20 wt % NHT samples were first heated at the rate of 20° C./min to 85° C., then kept isothermal for 10 minutes to remove water adsorbed on the surface of NHT. After dehydration, the samples were heated at the same rate to the desired decomposition test temperatures. Additional tests at 150° C. and 160° C. were done for the 20 wt % NHT samples because there was insufficient water removal to test 100° C. and 110° C. even with extended dehydration steps. The 50 wt % and 90 wt % NHT samples were directly heated at the rate of 20° C./min for decomposition, since no appreciable amount of water was observed to be adsorbed on the surfaces of those two types of NHT samples based on material balance. Each reported data point is the average value of three tests under the same experimental data conditions.

Characteristics of Materials

The BET analysis results of pure $NaHCO_3$ and $TiO(OH)_2$, and NHT samples is provided in Table 1.

TABLE 1

BET analyses of pure $TiO(OH_2)$, pure $NaHCO_3$, and 20 wt %, 50 wt % as well as 90 wt % samples before and after decomposition at 180° C.

| Sample | | Pure $TiO(OH)_2$ | Pure $NaHCO_3$ | 20 wt % NHT | 50 wt % NHT | 90 wt % NHT |
|---|---|---|---|---|---|---|
| Surface Area ($m^2/g$) | Prior to decomposition | 123.172 | 1.273 | 515.751 | 30.262 | 2.957 |
| | After decomposition | 278.751 | 5.288 | 442.136 | 72.901 | 6.754 |
| Pore Volume ($cm^3/g$) | Prior to decomposition | 0.083 | 0.002 | 0.438 | 0.045 | 0.004 |
| | After decomposition | 0.308 | 0.008 | 0.397 | 0.089 | 0.011 |
| Pore Size (nm) | Prior to decomposition | 4.056 | 4.552 | 3.189 | 6.153 | 5.802 |
| | After decomposition | 3.736 | 5.010 | 3.264 | 4.364 | 6.029 |

The BET analysis results of pure $NaHCO_3$, pure $TiO(OH)_2$, and 20 wt %, 50 wt % and 90 wt % NHT samples are provided in Table 1. Table 1 shows that $TiO(OH)_2$ is very porous, and its average diameter is only 4.55 nm. $NaHCO_3$, as expected, has a poor porous structure by itself. NHT has the smallest average pore size, the largest surface area, and the highest pore volume among three tested samples.

FIG. 1 shows FT-IR spectra of pure $TiO(OH)_2$, pure $NaHCO_3$, pure $Na_2CO_3$, and freshly prepared and decomposed 20 wt % NHT samples.

Referring to FIG. 1, the FT-IR absorption spectra of pure $TiO(OH)_2$ with and without heat treatment, pure $NaHCO_3$ and $Na_2CO_3$, and 20 wt % NHT before and after $CO_2$ desorption are shown. The pure $TiO(OH)_2$ exhibits a broad peak visible in the 400-900 $cm^{-1}$ range, shown in profile a, which is due to Ti—O bending. Sui, et al., "FTIR study on the formation of $TiO_2$ nanostructures in supercritical $CO_2$," *J. Phys. Chem. B*, 110, (2006), pp. 16212-16218, which is hereby incorporated by reference as if fully set forth herein.

The additional peaks at 1550 $cm^{-1}$ and in the 2500-3500 $cm^{-1}$ range are likely due to a small amount of water adsorbed on the surface of $TiO(OH)_2$. S. E. Stein, "IR and Mass Spectra.," *NIST Chemistry WebBook*; Mallard, W. G.; Linstrom, P. J., Eds. NIST Standard Reference Database Number 69; National Institute of Standards and Technology: Gaithersburg, Md., Water (http://webbook.nist.gov) retrieved Apr. 4, 2011, which is hereby incorporated by reference as if fully set forth herein.

The FT-IR profile b of the $TiO(OH)_2$ heated at 180° C. does not show any noticeable changes compared to profile a, except for an additional peak at 1400 $cm^{-1}$ which is also likely due to water, indicating that no new compounds were formed during the heating process and that $TiO(OH)_2$ can serve as a stable catalytic support for $Na_2CO_3/NaHCO_3$ based $CO_2$ separation. Sui, et al., "FTIR study on the formation of $TiO_2$ nanostructures in supercritical $CO_2$," *J. Phys. Chem. B*, 110, (2006), pp. 16212-16218, which is hereby incorporated by reference as if fully set forth herein.

While additional water could be a sign of $TiO(OH)_2$ decomposition to $TiO_2$ as shown in R3, no change was observed in the XRD pattern seen in FIG. 4, discussed below, further illustrating that little if any decomposition has occurred. The FT-IR spectra for pure $NaHCO_3$ and $Na_2CO_3$, presented in profiles c and d, respectively, match well with spectra found in references. S. E. Stein, "IR and Mass Spectra.," *NIST Chemistry WebBook*; Mallard, W. G.; Linstrom, P. J., Eds. NIST Standard Reference Database Number 69; National Institute of Standards and Technology: Gaithersburg, Md., (February) 2000, Sodium Bicarbonate (http://webbook.nist.gov) Retrieved Apr. 4, 2011; S. E. Stein, "IR and Mass Spectra.," *NIST Chemistry WebBook*; Mallard, W. G.; Linstrom, P. J., Eds. NIST Standard Reference Database Number 69; National Institute of Standards and Technology: Gaithersburg, Md., (February) 2000, Sodium Carbonate (http://webbook.nist.gov) retrieved Apr. 4, 2011; Nickolov, "FTIR analysis of water structure and its significance in the flotation of sodium carbonate and sodium bicarbonate salts," *Colloids Surf.*, A, 224, (2009), pp. 231-239; Rufino, et al., "Characterization of lithium and sodium salts of poly(methacrylic acid) by FTIR and thermal analyses," *Polym.*, 41, 2000, pp. 4213-4222, each of which is hereby incorporated by reference as if fully set forth herein.

The noteworthy peaks at 1300 $cm^{-1}$ for $NaHCO_3$ and at 1400 $cm^{-1}$ for $Na_2CO_3$ are due to carbonate asymmetric stretching. Rufino, et al., "Characterization of lithium and sodium salts of poly(methacrylic acid) by FTIR and thermal analyses," *Polym.*, 41, 2000, pp. 4213-4222, which is hereby incorporated by reference as if fully set forth herein.

The spectra of the freshly prepared and decomposed/spent NHT samples (profiles e and f) show peaks nearly identical to the pure $TiO(OH)_2$ spectrum, shifted slightly. The peak at 1300 $cm^{-1}$ in both profiles e and f may be due to the presence of $NaHCO_3$, which would indicate that $NaHCO_3$ in NHT does not decompose. However, no other distinct peaks for $NaHCO_3$ or $Na_2CO_3$ are present.

Figure 2:
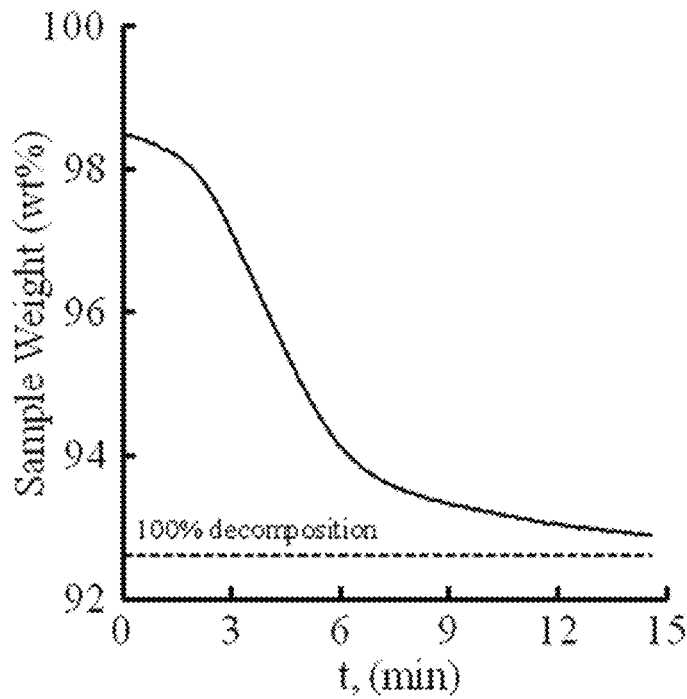
FIG. 2 shows a TGA curve for 20 wt % NHT decomposed at 180° C. according to another example.

FIG. 2 shows a TGA curve for 20 wt % NHT decomposed at 180° C. according to another example.

Referring to FIG. 2, the TGA data clearly indicates that the mass loss from the wt % NHT sample is consistent with the decomposition of $NaHCO_3$. Alternatively, the peak at 1300 $cm^{-1}$ may be due to water adsorbed to the surface of the sample, shifted due to the support. A third explanation for the peaks at 1550 and 1300 cm' is as follows. S. E. Stein, "IR and Mass Spectra.," *NIST Chemistry WebBook*; Mallard, W. G.; Linstrom, P. J., Eds. NIST Standard Reference Database Number 69; National Institute of Standards and Technology:

Gaithersburg, Md., Water (http://webbook.nist.gov) retrieved Apr. 4, 2011, which is hereby incorporated by reference as if fully set forth herein.

The structure of $HCO_3^-$, or [HO—C(O)—O—] where C(O) is the carbonyl, is a resonance hybrid. There is a central C=O, attached to the C is an OH with two unshared electron pairs on the O, and an O⁻ with three unshared electron pairs in $HCO_3^-$. Therefore, OH⁻ may dissociate from $HCO_3^-$ to form stable OH⁻ and $CO_2$ as described in the reaction of R4 as follows:

$$HCO_3^- \leftrightarrow OH^- + CO_2 \qquad R4$$

However, the forward reaction of R4 is very slow due to the relatively high strength of the bond between OH and C(O) as other researchers concluded. Glasscock, et al., "$CO_2$ absorption/desorption in mixtures of methyldiethanolamine with monoethanolamine or diethanolamine," Chem. Eng. Sci., 46, (1991), pp. 2829-2845; Liao, et al., "Kinetics of absorption of carbon dioxide into aqueous solutions of monoethanolamine+N-methyldiethanolamine," Chem. Eng. Sci., 57, (2002), pp. 4569-4582; Ramachandran, et al., "Kinetics of the absorption of $CO_2$ into mixed aqueous loaded solutions of monoethanolamine and methyldiethanolamine," Ind. Eng. Chem. Res., 45, (2006), pp. 2608-2616, each of which is hereby incorporated by reference as if fully set forth herein.

The bond becomes weaker at elevated temperatures used for $NaHCO_3$ decomposition or $CO_2$ desorption. Like any other metal oxide-hydroxides, the acidic $TiO(OH)_2$ has very high affinities with anions and can complex with OH⁻ loosely held by [HO—C(O)—O—] at higher temperatures to form a new species $[TiO(OH)_3]^-$. Rose, et al., "Structure and Mechanisms of Formation of $FeOOH(NO_3)$ Oligomers in the Early Stages of Hydrolysis," Langmuir, 13, (1997), pp. 3240-3246, which is hereby incorporated by reference as if fully set forth herein. Also, allowing C(O)—O— to dissociate from [HO—C(O)—O] to form stable $CO_2$ as shown in reaction of R5 as follows:

$$TiO(OH)_2 + HCO_3^- \leftrightarrow [TiO(OH)_3]^- + CO_2 \qquad R5$$

The intermediate $[TiO(OH)_3]^-$ can subsequently release the OH⁻ when another $HCO_3^-$ approaches it. The OH⁻ can combine with another $HCO_3^-$ to form $H_2O$ and $CO_3^{2-}$ as indicated in the reaction of R6:

$$[TiO(OH)_3]^- + HCO_3^- \leftrightarrow TiO(OH)_2 + H_2O + CO_3^{2-} \qquad R6$$

It is thought that the peaks at 1550 cm⁻¹ and 1300 cm⁻¹ in profiles e and f may be attributed to the $[TiO(OH)_3]^-$ in R5 and R6.

As NHT is heated for $CO_2$ desorption, no new peaks appear, demonstrating that NHT is stable and $TiO(OH)_2$ does not react with $NaHCO_3$ or $Na_2CO_3$ to form new undesired products.

Figure 3:
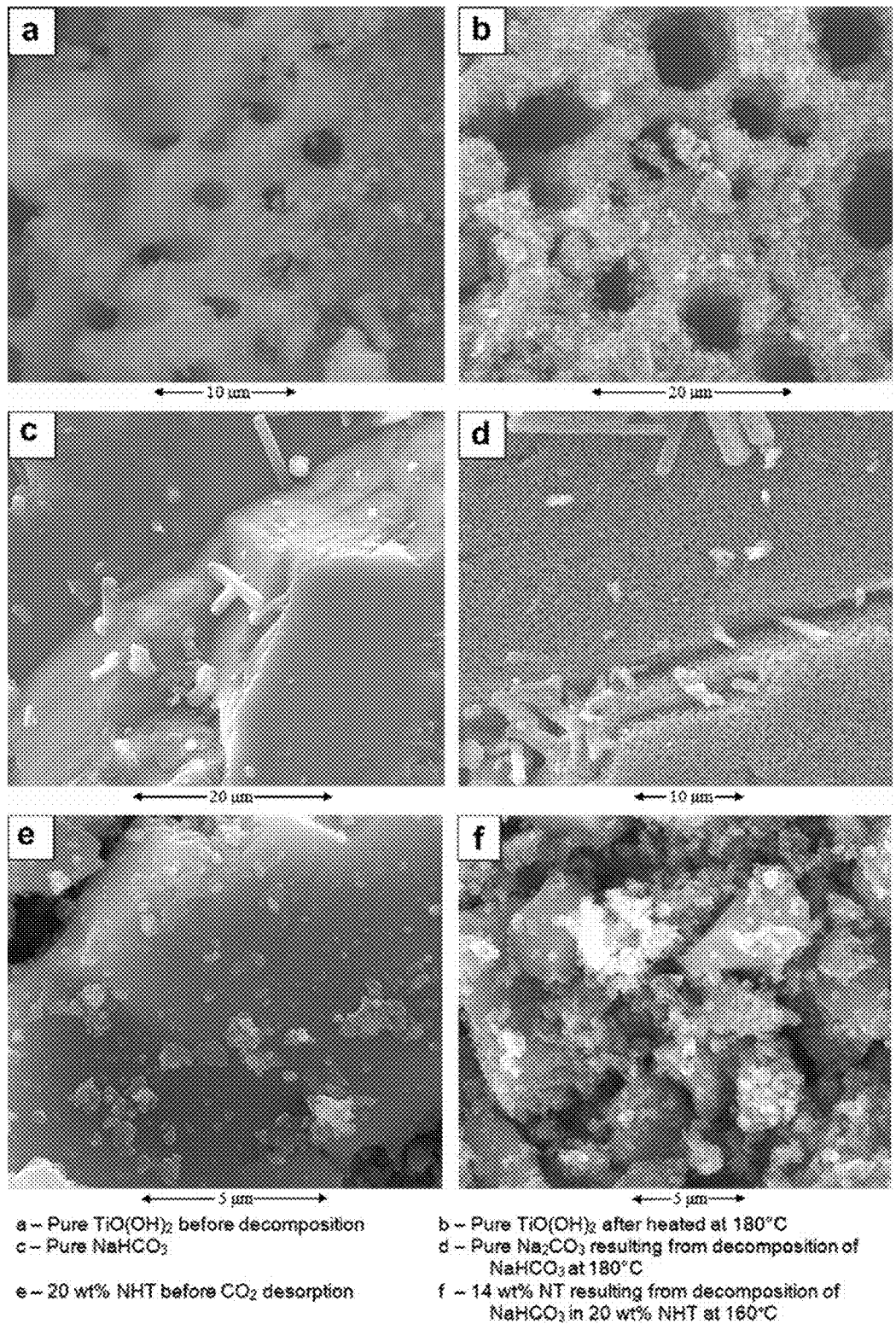
FIG. 3 shows SEM images of the pure TiO(OH)$_2$, pure NaHCO$_3$, pure Na$_2$CO$_3$, and freshly prepared and decomposed 20 wt % NHT samples according to another example.

FIG. 3 shows SEM images of the pure $TiO(OH)_2$, pure $NaHCO_3$, pure $Na_2CO_3$, and freshly prepared and decomposed 20 wt % NHT samples according to another example.

Referring to FIG. 3, the SEM images of the pure $TiO(OH)_2$, $NaHCO_3$, and 20 wt % NHT samples prior to and after heat treatment are shown. The magnifications used for in these images vary. Comparison of images 3-a and 3-b shows that the basic structure of $TiO(OH)_2$ is not affected by the heating process, although its pores become larger and surface area increases. It appears that the $Na_2CO_3$ resulting from the decomposition of $NaHCO_3$ possesses more nanopores as observed from images 3-c and 3-d. Examination of image e indicates that most $NaHCO_3$ is in the pores of highly porous $TiO(OH)_2$, which can also be easily understood when considering the fact that the unit pore volume of 20 wt % NHT is many times higher than those of $NaHCO_3$ and $TiO(OH)_2$. However, after decomposition of the $NaHCO_3$ or $CO_2$ desorption from NHT, larger pores appear as observed in image 3-b. In addition, the mass loss associated with the $NaHCO_3$ decomposition into $Na_2CO_3$ or $CO_2$ desorption from NHT leads to formation of porous $Na_2CO_3$ with a sponge-like structure as shown in image 3-d.

Figure 4:
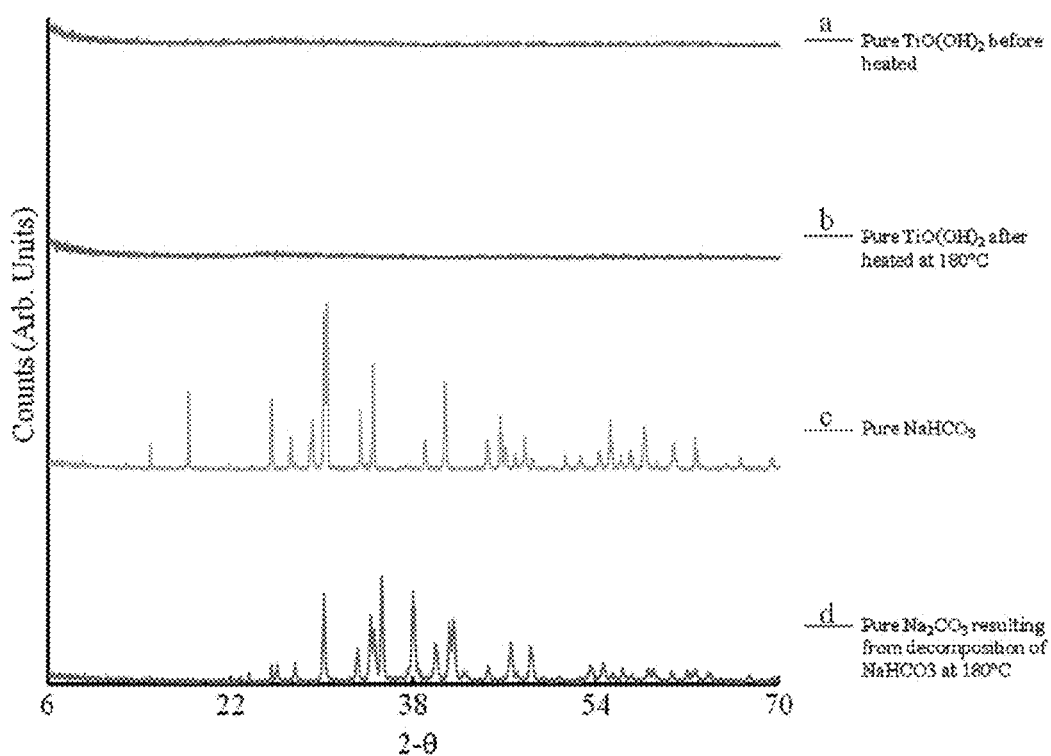
FIG. 4 shows XRD graphs of pure TiO(OH)$_2$, pure NaHCO$_3$, and pure Na$_2$CO$_3$ according to another example.

FIG. 4 shows a XRD graphs of the pure $TiO(OH)_2$, pure $NaHCO_3$, and pure $Na_2CO_3$ according to another example.

Referring to FIG. 4, patterns 4-c and 4-d are the typical XRD patterns of the $NaHCO_3$ and $Na_2CO_3$, respectively. Ballirano, et al., "Thermal behavior of natrite $Na_2CO_3$ in the 303-1013 K thermal range," Phase Transitions, 84, (2011), pp. 357-379; Kumar, et al., "Conductivity study of polyethylene oxide (PEO) complexed with sodium bicarbonate," J. Mater. Sci., 42, (2007), pp. 5752-5755, each of which is hereby incorporated by reference as if fully set forth herein. The $TiO(OH)_2$ sample used for synthesis of NHT is amorphous, although it contains trace amount of $TiO_2$, since its XRD patterns (patterns 4-a and 4-b) show tiny $TiO_2$ peaks in the form of anatase at the 2-θ value of 25.5. Li, et al., "Synthesis of $TiO_2$ nanorings and nanorods on TCO substrate by potentiostatic anodization of titanium powder," Cryst. Res. Technol., 46, (2011), pp. 413-416; Cheng, et al., "Optimizing preparation of the $TiO_2$ thin film reactor using the Taguchi method," Mater. Des., 31, (2010), pp. 1749-1751; S. Wilska, "An X-ray diffraction study to determine the effect of the method of preparation upon the crystal structure of $TiO_2$," Acta Chem. Scand., 8, (1954), pp. 1796-1801, each of which is hereby incorporated by reference as if fully set forth herein.

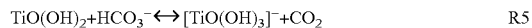

Figure 5:
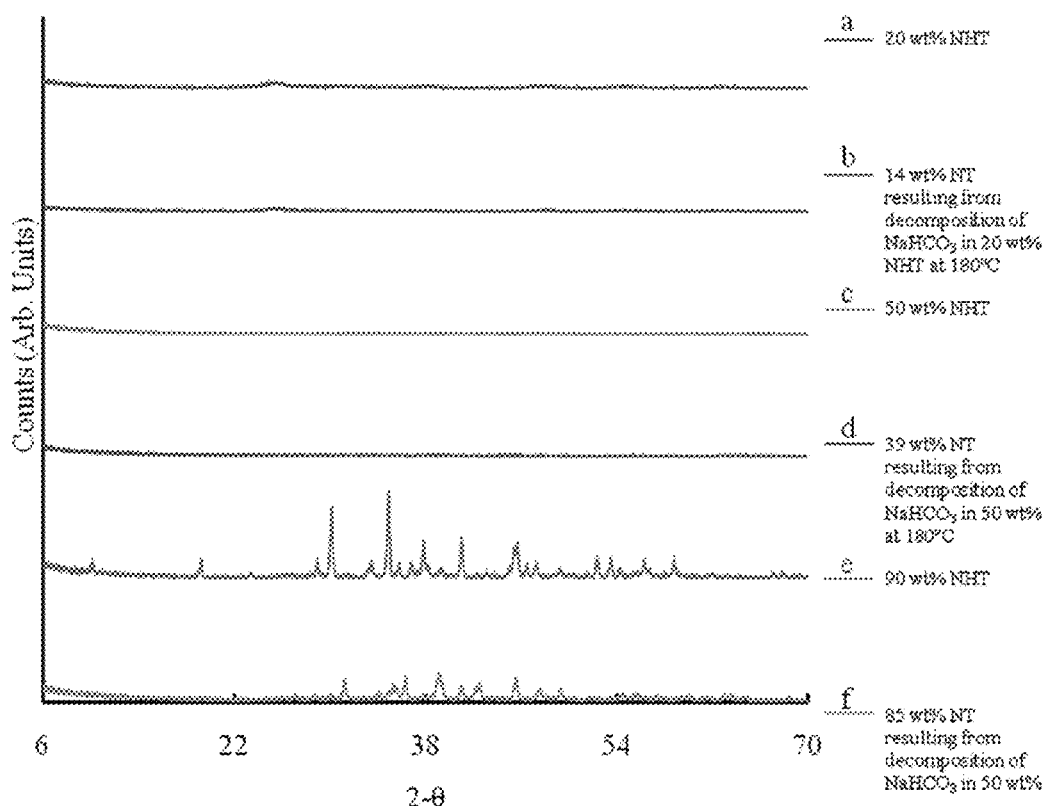
FIG. 5 shows XRD graphs of freshly prepared and decomposed 20, 50, and 90 wt % NHT according to another example.

FIG. 5 shows XRD graphs of freshly prepared and decomposed 20 wt %, 50 wt %, and 90 wt % NHT according to another example.

Referring to FIG. 5, the FTIR spectra of all NHT samples before and after $NaHCO_3$ decomposition show a little larger $TiO_2$ peak appears on the XRD pattern of the fresh 20 wt % NHT as observed in pattern 5-a, which then decreases after $NaHCO_3$ decomposition. A possible explanation for this comes from the differences in synthesis. It is believed that when the $TiO(OH)_2$ was mixed with the $NaHCO_3$ solution for a longer period of time relative to pure $TiO(OH)_2$ production, some of the solid $TiO(OH)_2$ particles decomposed. Additionally, the equilibrium of R3 may shift significantly while under vacuum, causing decomposition at lower temperatures. This peak is not apparent for 50 wt % and 90 wt % NHT, indicating that it is likely be due to the heterogeneity of the sample, which also explains the reduction in peak size after $NaHCO_3$ decomposition.

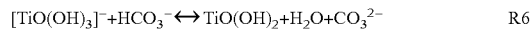

Neither the 20 wt % NHT in patterns 5-a and 5-b nor the 50 wt % NHT in patterns 5-c and 5-d show the characteristic peaks of $NaHCO_3$ and $Na_2CO_3$ (patterns 4-c and 4-d) due to their amorphous nature. Sager, et al., "Catalytic activity of supported platinum and metal oxide catalysts for toluene oxidation," Top. Catal., 52, (2009), pp. 517-527; Battezzati, et al., "Formation and crystallization of amorphous Ni—Ti powders prepared by mechanical alloying," J. Less-Common Met., 145, (1988), pp. 301-308; Karuppuchamy, et al., "Super-hydrophilic amorphous titanium dioxide thin film deposited by cathodic electrodeposition," Mater. Chem. Phys., 93, (2005), pp. 51-54, each of which is hereby incorporated by reference as if fully set forth herein. However, in patterns 5-e and 5-f, $NaHCO_3$ and $Na_2CO_3$, respectively, are clearly visible in the 90 wt % samples. This observation is also consistent with what Zhao found in the dispersion of $Na_2CO_3$ on γ-$Al_2O_3$. Zhao, et al., "Dispersion of $Na_2CO_3$ on γ-$Al_2O_3$ and the threshold effect in flue-gas desulfurization," Fuel, 81, (2002), pp. 1565-1568, which is hereby incorporated by reference as if fully set forth herein. These XRD analyses verify that no new crystalline phases are forming in an undesired reaction, providing one indication that NHT is stable during the desorption of $CO_2$ within the studied temperature range in agreement with the FT-IR analyses.

The characterization results demonstrate that NHT is stable during desorption of $CO_2$ and $TiO(OH)_2$ and that NHT does not react with $NaHCO_3$ or $Na_2CO_3$ to form new undesired products which could negatively affect the regeneration ability of $Na_2CO_3$ or stability of $TiO(OH)_2$ as a catalytic supporting material.

$NaHCO_3$ Decomposition or $CO_2$ Desorption Kinetics Rate Equation

The $CO_2$ desorption or $NaHCO_3$ decomposition kinetics of R2 was studied using the reported material decomposition models. Tanaka, et al., "Kinetics and mechanism of the thermal dehydration of calcium oxalate monohydrate," *Thermochim. Acta*, 48, (1981), pp. 137-146, which is hereby incorporated by reference as if fully set forth herein. According to those models, the rate equation of the $NaHCO_3$ decomposition or $CO_2$ desorption can be modeled by the equation of E1:

$$F(\alpha) = kt \qquad E1$$

where $\alpha$ is the mass fraction of decomposed $NaHCO_3$, k is the rate coefficient of the reverse reaction of R2, and t is time. $F(\alpha)$ can be in different forms, depending on the assumed mechanism of reverse R2. The $\alpha{\sim}t$ curves are needed for obtaining $F(\alpha){\sim}t$ relationships. The value of $\alpha$ is defined by equation of E2:

$$\alpha = \frac{w_0 - w}{w_0} \qquad E2$$

where $w_o$ is the initial mass of $NaHCO_3$ and w is the remaining mass of NaHCO3 at t.

The $\alpha$ values of the pure $NaHCO_3$ and the three different NHT samples at any decomposition time (t) can be calculated based on the stoichiometry of R2 and the corresponding sample's weight change profile collected during TGA tests.

Figure 6:
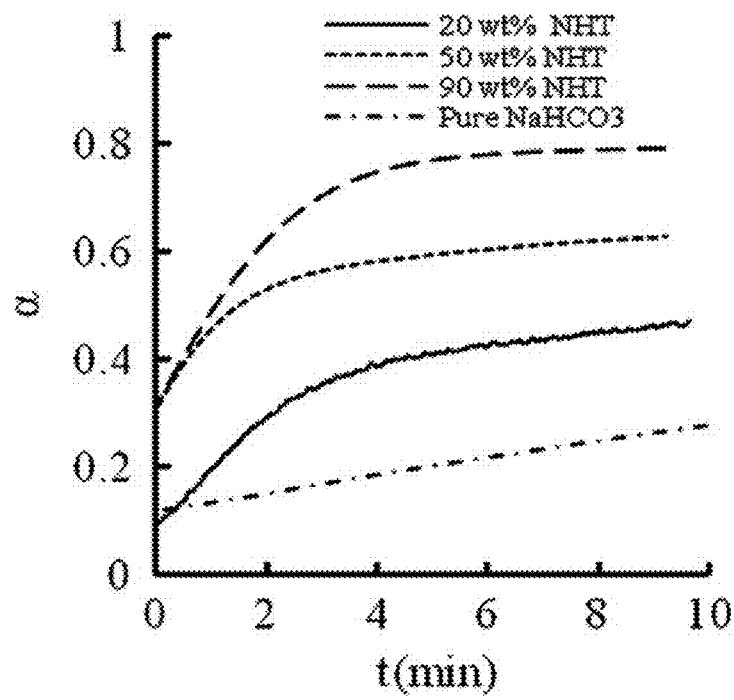
FIG. 6 shows a progression of α versus time according to another example.

FIG. 6 shows a progression of $\alpha$ versus time according to another example.

Referring to FIG. 6, the $\alpha{\sim}t$ curves of the four samples obtained at 120° C. are shown. The time scale has been shifted so that only the data recorded under isothermal conditions during $NaHCO_3$ decomposition or $CO_2$ desorption were used. Isothermal data were used so that k can be assumed constant for each experiment. For 20 wt % NHT, it is important to subtract the mass of water from the sample weight, which can be determined from mass balance. It is assumed that all adsorbed water is removed from the surface before the sample reached its isothermal test temperature.

Seven of the most commonly used $F(\alpha)$ forms are listed in Table 2.

TABLE 2

Seven common forms of $F(\alpha)$

| Model type (based on mechanism) | Symbol | $F(\alpha)$ | Reference |
|---|---|---|---|
| 1-D diffusion | $D_1$ | $\alpha^2$ | * |
| 1-D diffusion | $D_2$ | $\alpha + (1 - \alpha)\ln(1 - \alpha)$ | * |
| 1-D diffusion | $D_3$ | $[1 - (1 - \alpha)^{1/3}]^2$ | * |
| Ginstling-Brounshtein | $D_4$ | $1 - 2/3\alpha - (1 - \alpha)^{2/3}$ | * |
| Prout-Tompkins | $A_u$ | $\ln(\alpha/(1 - \alpha))$ | * |
| Contracting surface/volume | $R_n$ | $1 - (1 - \alpha)^{1/n}$ | * |
| Avrami-Erofeev | $A_m$ | $[-\ln(1 - \alpha)]^{1/m}$ | * |

* Heda, et al., "A method of assessing solid state reactivity illustrated by thermal decomposition experiments on sodium bicarbonate," *Thermochim. Acta*, 255, (1995), pp. 255-272; Tanaka, et al., "Kinetics and mechanism of the thermal dehydration of calcium oxalate monohydrate," *Thermochim. Acta*, 48, (1981), pp. 137-146; Sestak, et al., "Study of the kinetics of the mechanism of solid state reaction at increasing temperatures," *Thermochim. Acta*, 3, (1971), pp. 1-12, each of which is hereby incorporated by reference as if fully set forth herein.

The most appropriate $F(\alpha)$ form for a specific decomposition reaction should meet two conditions. First, the regression coefficients of the $F(\alpha){\sim}t$ relationships obtained under different reaction conditions are high. Second, the reaction orders derived with the same $F(\alpha)$ form under different reaction conditions vary in a narrow range. Of all the seven $F(\alpha)$ forms we tested, only the Avrami-Erofeyev (called $A_m$ hereafter) model or $$F(\alpha) = [-\ln(1 - \alpha)]^{\frac{1}{m}} \qquad E3$$

where m is the reaction order, can meet the two aforementioned requirements. Yamada, et al., "Kinetics of the thermal decomposition of sodium hydrogencarbonate evaluated by controlled rate evolved gas analysis coupled with thermogravimetry," *Thermochim. Acta*, 431, (2005), pp. 38-43; Heda, et al., "A method of assessing solid state reactivity illustrated by thermal decomposition experiments on sodium bicarbonate," *Thermochim. Acta*, 255, (1995), pp. 255-272; Tanaka, "Comparison of thermal properties and kinetics of decompositions of $NaHCO_3$ and $KHCO_3$," *J. Therm. Anal.*, 32, (1987), pp. 521-526, each of which is hereby incorporated by reference as if fully set forth herein. While other models are nearly as good a fit as the $A_m$ model, the $A_m$ model is chosen for this work also because it is consistent with the work of others. Yamada, et al., "Kinetics of the thermal decomposition of sodium hydrogencarbonate evaluated by controlled rate evolved gas analysis coupled with thermogravimetry," *Thermochim. Acta*, 431, (2005), pp. 38-43; Tanaka, "Comparison of thermal properties and kinetics of decompositions of $NaHCO_3$ and $KHCO_3$," *J. Therm. Anal.*, 32, (1987), pp. 521-526; each of which is hereby incorporated by reference. This implies that the random nucleation of $Na_2CO_3$ generated during $CO_2$ desorption from NHT or $NaHCO_3$ decomposition process is a kinetic control process. Tanaka, et al., "Kinetics and mechanism of the thermal dehydration of calcium oxalate monohydrate," *Thermochim. Acta*, 48, (1981), pp. 137-146; Sestak, et al., "Study of the kinetics of the mechanism of solid state reaction at increasing temperatures," *Thermochim. Acta*, 3, (1971), pp. 1-12; Marinoni, et al., "Kinetic study of mullite growth in sanitary-ware production by in situ HT-XRPD the influence of the filler/flux ratio," *J. Eur. Ceram. Soc.*, 31, (2011), pp. 273-280; Koradia, et al., "Integrated approach to study the dehydration kinetcs of nitrofuantoin monohydrate," *J. Pharm. Sci.*, 99, (2010), pp. 3966-3976; Wu, et al., "Intrinsic kinetics of reoxidation reaction for a multicomponent molybdate catalyst by thermal analysis method," *Catal. Commun.*, 10, (2009), pp. 1066-1069; Konieczny, et al., "Catalyst development for thermocatalytic decomposition of methane to hydrogen," *Int. J.*

Hydrogen Energy, 33, (2008), pp. 264-272; Koga, et al., "Kinetic and morphological studies of the thermal dehydration of α-nickel(II) sulfate hexahydrate," J. Phys. Chem., 98, (1994), pp. 10521-10528, each of which is hereby incorporated by reference as if fully set forth herein.

However, as α values increase or $CO_2$ desorption processes are in their later stages (the flat sections of the α~t curves in FIG. 4), diffusion of the gaseous products ($CO_2$ and $H_2O$) through NHT or $NaHCO_3$ gradually start to limit the overall reaction rate. The Avrami-Erofeyev model is not applicable in the diffusion controlled regions. The kinetic control period of the decomposition of pure $NaHCO_3$ is much longer than those with three NHT samples, while 50 wt % NHT sample has the shortest one.

Figure 7:
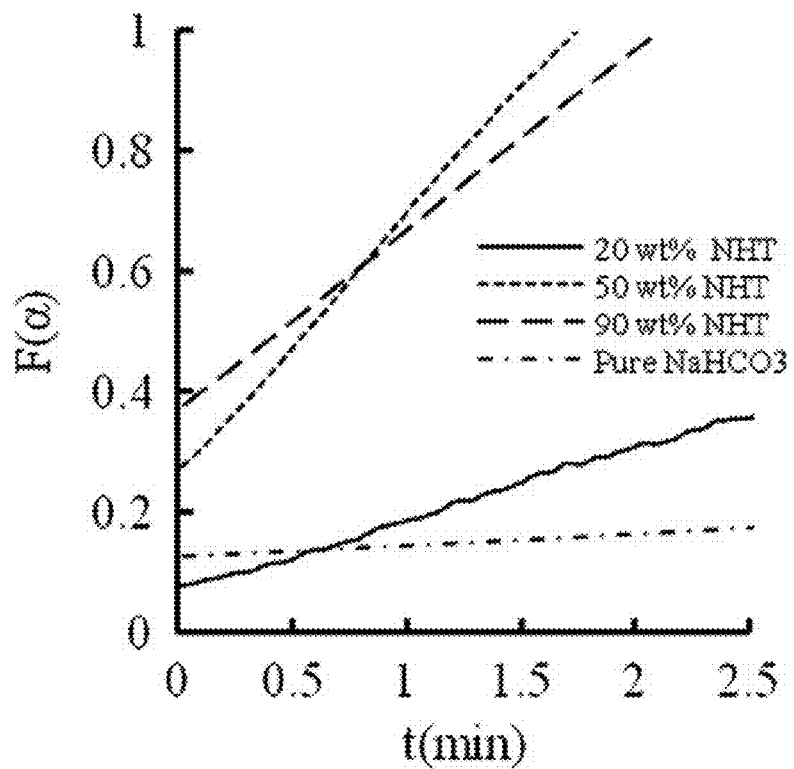
FIG. 7 shows an $A_m$ model based on F(α)-t correlations of pure NaHCO$_3$, 20, 50, and 90 wt % NHT according to another example.

FIG. 7 shows an $A_m$ model based F(α)–t correlations of pure $NaHCO_3$, 20 wt %, 50 wt %, and 90 wt % NHT according to another example.

Referring to FIG. 7, the TGA operation conditions were as follows: heating rate=20° C./min in the temperature range of 25-120° C., Ar flow=0.1 L/min, isothermal at t=0. The F(α)~t curves visually demonstrate the linearity of the $A_m$ model. The calculated m values in E3 and the corresponding regression coefficients of the pure $NaHCO_3$ and the three different NHT samples are listed in Table 3.

The values of m for the decomposition of $NaHCO_3$ on $TiO(OH)_2$ or $CO_2$ desorption from NHT with respect to $NaHCO_3$ are found to be in the range of 0.4-1.1, depending on the temperature and weight percent of $NaHCO_3$ in NHT, and the average reaction order is about 0.75. The rate equation of decomposition of $CO_2$ desorption from NHT with respect to $NaHCO_3$ can be generally expressed as follows $$\frac{d\alpha}{dt} = k(1-\alpha)^m \qquad \text{E4}$$

where k is the rate coefficient of $CO_2$ desorption from NHT. The k values obtained under different test conditions are listed in Table 4. The highest k values are associated with the $CO_2$ desorption from 50 wt % NHT, which are about 12 times higher than those with pure $NaHCO_3$ decomposition. Obviously, $TiO(OH)_2$ in NHT considerably improves the kinetics of $NaHCO_3$ decomposition, and thus $CO_2$ desorption kinetics when NT is used as solid sorbent for $CO_2$ in flue gas.

TABLE 3

Typical correlation coefficients of each form of F(α)-t listed in Table 2 (T = 120° C., n = 3, TGA heated at 20° C./min to listed temperature, 0.1 L/min flow Ar, 20 wt % NHT dehydrated at 85° C. for 10 min).

| NHT Sample | Temp. [C.] | $D_1$ | $D_2$ | $D_3$ | $D_4$ | $A_u$ | $R_n$ | $A_m$ | m |
|---|---|---|---|---|---|---|---|---|---|
| Pure $NaHCO_3$ | 100 | 0.9815 | 0.9809 | 0.9803 | 0.9807 | 0.9434 | 0.9986 | 0.9992 | 0.9 |
| | 120 | 0.9968 | 0.9942 | 0.9906 | 0.9931 | .09850 | 0.9996 | 1.0000 | 1.0 |
| | 140 | 0.9942 | 0.9851 | 0.9695 | 0.9804 | 0.9728 | 0.9994 | 0.9991 | 1.2 |
| | 160 | 0.9942 | 0.9851 | 0.9695 | 0.9804 | 0.9728 | 0.9994 | 0.9991 | 1.2 |
| | 180 | 0.9986 | 0.9966 | 0.9867 | 0.9941 | 0.9929 | 0.9995 | 0.9999 | 1.2 |
| | 200 | 0.9983 | 0.9995 | 0.9931 | 0.9983 | 1.0000 | 0.9999 | 1.0000 | 2.0 |
| 90 wt % | 100 | 0.9962 | 0.9935 | 0.9896 | 0.9923 | 0.9898 | 0.9998 | 0.9994 | 0.8 |
| | 110 | 0.9964 | 0.9944 | 0.9916 | 0.9935 | 0.9933 | 0.9999 | 1.0000 | 1.1 |
| | 120 | 1.0000 | 0.9996 | 0.9985 | 0.9993 | 0.9981 | 0.9998 | 1.0000 | 1.0 |
| | 130 | 0.9989 | 0.9998 | 0.9996 | 0.9999 | 0.9971 | 0.9988 | 1.0000 | 0.8 |
| | 140 | 0.9990 | 0.9998 | 0.9999 | 0.9999 | 0.9987 | 0.9993 | 1.0000 | 0.7 |
| 50 wt % | 100 | 0.9997 | 0.9992 | 0.9981 | 0.9989 | 0.9938 | 0.9990 | 0.9998 | 0.9 |
| | 110 | 0.9986 | 0.9995 | 0.9997 | 0.9996 | 0.9921 | 0.9969 | 0.9998 | 0.6 |
| | 120 | 0.9965 | 0.9981 | 0.9993 | 0.9986 | 0.9925 | 0.9956 | 0.9998 | 0.5 |
| | 130 | 0.9927 | 0.9957 | 0.9981 | 0.9967 | 0.9870 | 0.9917 | 0.9993 | 0.5 |
| | 140 | 0.9964 | 0.9978 | 0.9990 | 0.9983 | 0.9958 | 0.9967 | 0.9999 | 0.4 |
| 20 wt % | 120 | 0.9949 | 0.9934 | 0.9915 | 0.9928 | 0.9861 | 0.9985 | 0.9989 | 0.9 |
| | 140 | 0.9984 | 0.9991 | 0.9994 | 0.9993 | 0.9873 | 0.9954 | 0.9994 | 0.6 |
| | 150 | 0.9952 | 0.9973 | 0.9985 | 0.9979 | 0.9804 | 0.9913 | 0.9987 | 0.6 |
| | 160 | 0.9983 | 0.9987 | 0.9988 | 0.9988 | 0.9952 | 0.9975 | 0.9988 | 0.6 |
| | 180 | 0.9953 | 0.9979 | 0.9996 | 0.9987 | 0.9956 | 0.9966 | 0.9997 | 0.6 |

The average reaction order for the decomposition of pure $NaHCO_3$ or $CO_2$ desorption with respect to $NaHCO_3$ is found to be 1.1, consistent with the values reported in the literature. Yamada, et al., "Kinetics of the thermal decomposition of sodium hydrogencarbonate evaluated by controlled rate evolved gas analysis coupled with thermogravimetry," Thermochim. Acta, 431, (2005), pp. 38-43; Heda, et al., "A method of assessing solid state reactivity illustrated by thermal decomposition experiments on sodium bicarbonate," Thermochim. Acta, 255, (1995), pp. 255-272; Tanaka, "Comparison of thermal properties and kinetics of decompositions of $NaHCO_3$ and $KHCO_3$," J. Therm. Anal., 32, (1987), pp. 521-526, each of which is hereby incorporated by reference as if fully set forth herein.

Arrhenius Form

The kinetic rate coefficients are related to the activation energy through the Arrhenius form equation of E5 as follows:

$$\ln k = -\frac{E_a}{RT} + \ln A \qquad \text{E5}$$

where A is the frequency factor, $E_a$ is the activation energy, R is the ideal gas constant, and T is the absolute temperature. The activation energies and frequency factors of E5 for the $CO_2$ desorption from the pure $NaHCO_3$ and three NHT samples can be obtained using their corresponding relationships between ln k and $$\frac{1}{T}.$$

Figure 8:
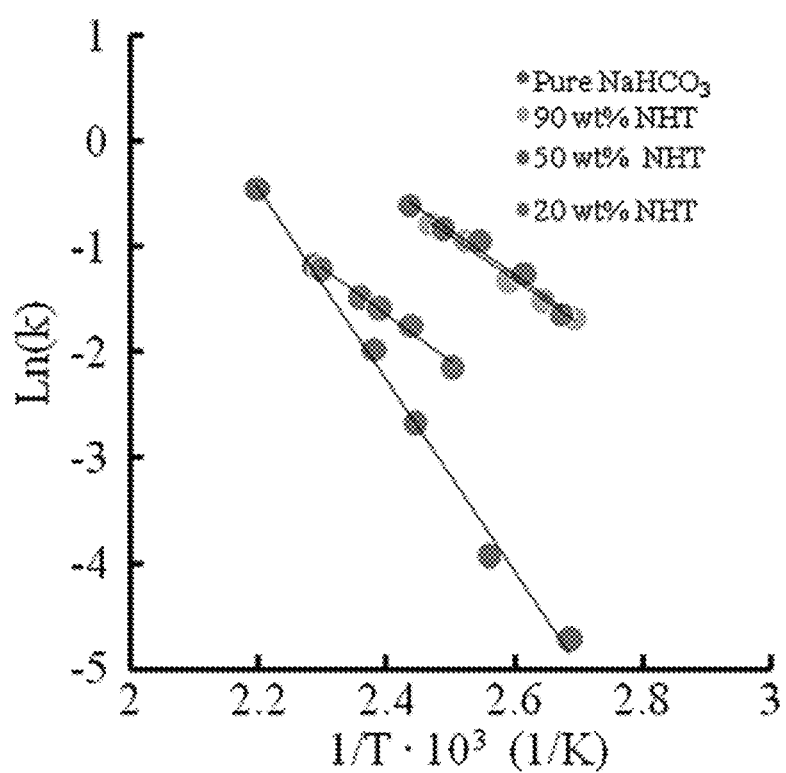
FIG. 8 shows Arrhenius plots of decomposition reactions of pure NaHCO$_3$, 20, 50, 90 wt % NHT according to another example.

Based on the k values listed in Table 4 and the temperatures at which the corresponding $NaHCO_3$ decomposition tests with the pure $NaHCO_3$ and three NHT samples were performed, the four $$\ln k \sim \frac{10^3}{T}$$

relationships are established and plotted in FIG. 8.

TABLE 4

Average reaction orders and correlation coefficients obtained with Am model under different conditions [TGA operation conditions: heated at 20 _C./min to temperature, 0.1 L/min flow Ar, 20 wt % NHT dehydrated at 85 _C. for 10 min].

| Sample | Temperature (° C.) | Reaction Order | k(min$^{-1}$) | $R^2$ |
|---|---|---|---|---|
| Pure $NaHCO_3$ | 100 | 0.9 | 0.01 | 0.9984 |
| | 120 | 1.0 | 0.02 | 1.0000 |
| | 140 | 1.3 | 0.06 | 0.9999 |
| | 160 | 1.2 | 0.13 | 0.9981 |
| | 180 | 1.3 | 0.29 | 0.9997 |
| | 200 | 1.3 | 0.57 | 0.9985 |
| 90 wt % NHT | 100 | 1.1 | 0.19 | 0.9998 |
| | 110 | 1.0 | 0.22 | 0.9999 |
| | 120 | 1.0 | 0.27 | 0.9998 |
| | 130 | 0.9 | 0.39 | 0.9999 |
| | 140 | 0.8 | 0.46 | 1.0000 |
| 50 wt % NHT | 100 | 0.8 | 0.19 | 0.9996 |
| | 110 | 0.7 | 0.29 | 0.9996 |
| | 120 | 0.6 | 0.39 | 0.9994 |
| | 130 | 0.5 | 0.44 | 0.9994 |
| | 140 | 0.4 | 0.55 | 0.9999 |
| 20 wt % NHT | 120 | 0.5 | 0.12 | 0.9979 |
| | 130 | 0.6 | 0.17 | 0.9976 |
| | 140 | 0.6 | 0.21 | 0.9993 |
| | 150 | 1.0 | 0.57 | 0.9988 |
| | 160 | 1.3 | 0.63 | 0.9978 |

The resultant regression equations and coefficients as well as the kinetic parameters of Arrhenius forms are presented in Table 5.

TABLE 5

Regression equations, correlation coefficients, frequency factors, and activation energy of the CO2 desorption of pure NaHCO3 and NHT samples. (Am model used with reaction orders from Table 4, TGA heated at 20 _C./min to temperature, 0.1 L/min flow Ar, 20 wt% NHT dehydrated at 85 _C. for 10 min).

| Sample | $\ln(k) \sim \frac{10^3}{T}$ | $R^2$ | A(min$^{-1}$) | $E_a$ (kJ/mol) |
|---|---|---|---|---|
| Pure $NaHCO_3$ | −9100 + 19.5 | 0.9969 | 3.0E+08 ± 1.3E+07 | 75 ± 5.2 |
| 90 wt % NHT | −4200 + 9.6 | 0.9950 | 14,000 ± 1600 | 35 ± 3.4 |
| 50 wt % NHT | −4200 + 9.6 | 0.9853 | 15,000 ± 1300 | 35 ± 2.8 |
| 20 wt % NHT | −4400 + 9.0 | 0.9929 | 7800 ± 1200 | 37 ± 4.9 |

The activation energy and frequency factor values obtained with this research for decomposition of pure $NaHCO_3$ were 75 kJ/mol and $3 \times 10^8$ min$^{-1}$, respectively. This activation energy value is on the low end of the range reported in the literature, 80~100 kJ/mol. Yamada, et al., "Kinetics of the thermal decomposition of sodium hydrogencarbonate evaluated by controlled rate evolved gas analysis coupled with thermogravimetry," Thermochim. Acta, 431, (2005), pp. 38-43; Heda, et al., "A method of assessing solid state reactivity illustrated by thermal decomposition experiments on sodium bicarbonate," Thermochim. Acta, 255, (1995), pp. 255-272; Tanaka, "Comparison of thermal properties and kinetics of decompositions of $NaHCO_3$ and $KHCO_3$," J. Therm. Anal., 32, (1987), pp. 521-526; B. Jankovic, "Kinetic analysis of isothermal decomposition process of sodium bicarbonate using the Weibull probability function—estimation of density distribution functions of the apparent activation energies," Metall. Mater. Trans. B, 40, (2009), pp. 712-726.; Subramanian, et al., "Thermal decomposition kinetics of sodium bicarbonate by differential thermal analysis," J. Therm. Anal., 4, (1972), pp. 89-93, each of which is hereby incorporated by reference as if fully set forth herein. The frequency factor is also within the range of reported values. Yamada, et al., "Kinetics of the thermal decomposition of sodium hydrogencarbonate evaluated by controlled rate evolved gas analysis coupled with thermogravimetry," Thermochim. Acta, 431, (2005), pp. 38-43; Heda, et al., "A method of assessing solid state reactivity illustrated by thermal decomposition experiments on sodium bicarbonate," Thermochim. Acta, 255, (1995), pp. 255-272; Tanaka, "Comparison of thermal properties and kinetics of decompositions of $NaHCO_3$ and $KHCO_3$," J. Therm. Anal., 32, (1987), pp. 521-526, each of which is hereby incorporated by reference as if fully set forth herein.

The kinetic data collected for the decomposition of $NaHCO_3$ catalyzed with $TiO(OH)_2$ are shown in Table 5. Use of $TiO(OH)_2$ as a support for $NaHCO_3$ decomposition can lead to a significant cut of activation energy of the reaction, ~50%, regardless of the concentrations of $NaHCO_3$ in the nanoporous NHT. Obviously, $TiO(OH)_2$ plays a catalytic role in $NaHCO_3$ decomposition since it can significantly decrease the activation energy of $NaHCO_3$ decomposition and its structure remains unchanged at the end of $NaHCO_3$ decomposition.

However, the A values in the derived Arrhenius forms of $NaHCO_3$ decomposition catalyzed with $TiO(OH)_2$ vary from one NHT to another one. The Arrhenius form states that reaction rate coefficient increases with the value of A. According to reaction theory, A is the number of total collisions among $NaHCO_3$ molecules. The A value increases with the weight percent of $NaHCO_3$ on the surface of the TiO $(OH)_2$ as observed from the comparison of the kinetic parameters of 20 wt % and 50 wt % NHT samples in Table 5. However, this trend is only observed up to a certain point. As the weight percent of $NaHCO_3$ continues to increase, more $NaHCO_3$ molecules start to stack on top of one another rather than attach to the surface of $TiO(OH)_2$. The $NaHCO_3$ molecules on the top layers need to overcome higher resistance when they transport to the surface of $TiO(OH)_2$ for catalytic decomposition, thus 90 wt % NHT has a lower A in the Arrhenius relationship compared to 50 wt % NHT based $NaHCO_3$ decomposition or $CO_2$ desorption.

Implications—Energy and Environmental Benefits of NT/NHT Based $CO_2$ Separation Technology FIG. 8 shows an Arrhenius plots of the decomposition reactions of pure $NaHCO_3$, 20 wt %, 50 wt %, 90 wt % NHT according to another example.

Referring to FIG. 8 and Table 5, it is shown that $TiO(OH)_2$ can increase $NaHCO_3$ decomposition or $CO_2$ desorption rates at given temperatures or lower $NaHCO_3$ decomposition or $CO_2$ desorption temperatures when reaction rates are set. Accordingly, $TiO(OH)_2$ should also improve the kinetics of $CO_2$ adsorption based on $$\Delta H = E_{a,R2} - E_{a,-R2} \qquad \text{E6}$$

where $\Delta H$ is the enthalpy change or the reaction heat of R2, $E_{a,R2}$ is the activation energy of the forward reaction of R2 or $CO_2$ adsorption, and $E_{a,-R2}$ is the activation energy of the reverse reaction (−R2) of R2 or $NaHCO_3$ decomposition or $CO_2$ desorption. $\Delta H$ is a constant at a given temperature, thus $TiO(OH)_2$ not only lowers the activation energy of $CO_2$ desorption, $E_{a,-R2}$, but also decreases the activation energy of $CO_2$ adsorption, $E_{a,R2}$, which can lead to two potential benefits. The first one is the increase in $CO_2$ adsorption rates of R2 at any given adsorption temperatures, and the second one is the decrease in $CO_2$ adsorption temperature at the given sorption reaction rates. In coal fired power plants, any changes in flue gas temperatures for $CO_2$ sorption are not desirable, since a lot of additional energy needs to be provided for the change due to the volume size of flue gas in power plants. Therefore, at a given $CO_2$ sorption temperature, $TiO(OH)_2$ can be used to increase $CO_2$ sorption rate and consequently reduce the size of the $CO_2$ adsorber, which otherwise should be much larger without use of $TiO(OH)_2$ as a catalytic support for $Na_2CO_3/NaHCO_3$.

The effect of $TiO(OH)_2$ on the $Na_2CO_3/NaHCO_3$ based $CO_2$ separation process can be assessed using the following equation of E7:

$$Q_{rege} = B \cdot C_{p,NHT} \cdot m_{CO_2}(T_{CO_2-d} - T_{CO_2-a})/L + m_e C_e \cdot (T_{CO_2-d} - T_{CO_2-a}) + m_{CO_2} \cdot C_{p,CO_2} \cdot T_{CO_2-d} \cdot m_{CO_2} \cdot C_{p,NHT} \cdot T_{CO_2-a} + \Delta H \cdot m_{CO_2} \cdot 1000/M_{CO_2} \qquad \text{E7}$$

where $Q_{rege}$ is the heat (kJ) input for sorbent regeneration of certain amount of adsorbed $CO_2$, $m_{CO_2}$ (kg–$CO_2$), B is a dimensional conversion coefficient, $C_{p,NHT}$[kJ/(kg·K)] is the specific heat capacity of spent sorbent, NHT, $T_{CO_2-a}$ and $T_{CO_2-d}$ are $CO_2$ adsorption and desorption temperatures, respectively, L (kg–$CO_2$/kg–NT) is the $CO_2$ adsorption capacity of NT, $m_e$(kg) and $C_e$[kJ/(kg·K)] are the mass and specific heat capacity of the equipment needed for NHT regeneration, $C_{p,CO_2}$[kJ/(kg·K)] is the specific heat capacity of $CO_2$, $M_{CO_2}$ is the molecular weight of $CO_2$, and $\Delta H$ is the enthalpy change or the reaction heat of R2 in E6. Sjostrom, et al., "Evaluation of solid sorbents as a retrofit technology for $CO_2$ capture," Fuel, 89, (2010), pp. 1298-1306; Hoffman, et al., "Factors in reactor design for dioxide with solid, regenerable sorbents," In Proceedings of the International Technical Conference on Coal Utilization & Fuel Systems, 2, (2008), pp. 1139-1150, each of which is hereby incorporated by reference as if fully set forth herein.

As discussed herein, use of $TiO(OH)_2$ can reduce the size of adsorber/desorber used for $CO_2$ separation, and thus the values of B, $m_e$, and $T_{CO_2-d}$ in E7. Moreover, L could potentially be increased due to use of $TiO(OH)_2$ as a support for $Na_2CO_3$ Green, et al., "Capture of carbon dioxide from flue gas using solid regenerable sorbents," Int. J. Environ. Technol. Manage., 4, (2004), pp. 53-67; Zhao, et al., "$CO_2$ absorption using dry potassium-based sorbents with different supports," Energy Fuels, 23, (2009), pp. 4683-4687; Lee, et al., "Dry potassium-based sorbents for $CO_2$ capture," Catal. Surv. Asia, 11, (2007), pp. 171-185; Park, et al., "Carbonate kinetics of potassium carbonate by carbon dioxide," J. Ind. Eng. Chem., 12, (2006), pp. 522-530; Park, et al., "Sorption of carbon dioxide onto sodium carbonate," Sep. Sci. Technol., 41, (2006), pp. 2665-2684; Shigemoto, et al., "Material balance and energy consumption for $CO_2$ Recover from moist flue gas employing $K_2CO_3$-on-activated carbon and its evaluation for practical adaptation," Energy Fuels, 20, (2006), pp. 721-726; Lee, et al., "$CO_2$ absorption and regeneration using Na and K based sorbents," Stud. Surf. Sci. Catal., 153, (2004), pp. 527-530; Liang, et al., "Carbon dioxide capture using dry sodium-based sorbents," Energy Fuels, 18, (2004), pp. 569-575; Okunev, et al., "Sorption of carbon dioxide by the composite sorbent potassium carbonate in porous matrix," Russ. Chem. Bull., 52, (2003), pp. 359-363; Sharonov, et al., "Sorption of $CO_2$ from humid gases on potassium carbonate supported by porous matrix," Russ. J. Appl. Chem., 74, (2001), pp. 409-413; Okunev, et al., "Sorption of carbon dioxide from wet gases by $K_2CO_3$-in-porous matrix: influence of the matrix nature," React. Kinet. Catal. Lett., 71, (2000), pp. 355-362; Hayashi, et al., "Efficient recovery of carbon dioxide from flue gases of coal-fired power plants by cyclic fixed-bed operations over $K_2CO_3$-on-Carbon," Ind. Eng. Chem. Res., 37, (1998), pp. 185-191; Hirano, et al., "Cyclic fixed-bed operation over $K_2CO_3$-on-carbon for the recovery of carbon dioxide under moist conditions," Bull. Chem. Soc. Jpn., 68, (1995), pp. 1030-1035, each of which is hereby incorporated by reference as if fully set forth herein. Obviously, all these factors can make contributions to the potentially significant reduction in $Q_{rege}$, although it cannot decrease the $\Delta H$ value of R2 in E7.

Based on thermodynamic calculations, the theoretical enthalpy change of the reversible reaction of R2 or the theoretical $CO_2$ desorption heat of $Na_2CO_3/NaHCO_3$ based $CO_2$ separation is 82.6 kJ/mol–$CO_2$, slightly lower than that associated with $CO_2$ separation with 100% MEA, 88.13 kJ/mol–$CO_2$. Plaza, et al., "Modeling $CO_2$ capture with aqueous monoethanolamine," International Journal of Greenhouse Gas Control, 4, (2010), pp. 161-166, which is hereby incorporated by reference as if fully set forth herein. Apparently, $Na_2CO_3$ is a promising material for $CO_2$ separation. However, due to the slowness of $NaHCO_3$ decomposition, the potential of an $Na_2CO_3/NaHCO_3$ based $CO_2$ separation process has been suspected to be incomparable to those amine based technologies. Given that the NT/NHT process can considerably improve the $CO_2$ desorption kinetics of R2, it is expected that the energy saving potential of $Na_2CO_3$ as a $CO_2$ capture agent can be better developed. Moreover, $Na_2CO_3$ is more environmentally benign than amine based sorbents since they are more volatile and instable under $CO_2$ desorption conditions. Therefore, the NT/NHT technology may significantly enhance the competitiveness of $Na_2CO_3$ as a cost-effective $CO_2$ separation agent compared to amine based compounds.

Impact on Amine Based $CO_2$ Separation

Various amine based compounds have been explored as $CO_2$ separation agents. Duke, et al., "Assessment of postcombustion carbon capture technologies for power generation," Front. Chem. Eng. China, 4, (2010), pp. 184-195; Yang, et al., "Progress in carbon dioxide separation and capture: a review," J. Environ. Sci., (Beijing, China), 20, (2008), pp. 14-27; Plaza, et al., "Modeling $CO_2$ capture with aqueous monoethanolamine," International Journal of Greenhouse

*Gas Control*, 4, (2010), pp. 161-166; Hicks, et al., "Designing Adsorbents for CO₂ Capture from Flue Gas-Hyperbranched Aminosilicas Capable of Capturing CO₂ Reversibly," *J. Am. Chem. Soc.*, 130, (2008), pp. 2902-2903, each of which is hereby incorporated by reference as if fully set forth herein.

Quantitative studies on $CO_2$ desorption activation energies of solid amine based $CO_2$ sorbents have not been reported. However, the activation energies of $CO_2$ desorption from liquid spent amine compounds reportedly vary with the structures of amines and the operation conditions under which $CO_2$ separation is conducted. Plaza, et al., "Modeling $CO_2$ capture with aqueous monoethanolamine," *International Journal of Greenhouse Gas Control*, 4, (2010), pp. 161-166, which is hereby incorporated by reference as if fully set forth herein. For example, according to Plaza, the activation energy of $CO_2$ desorption from spent monoethenalamine (MEA) varies from 114 kJ/mol to ~103 kJ/mol when the $CO_2$ sorption environment changes from an aqueous to a highly concentrated MEA solution, in a higher range compared to pure $NaHCO_3$. Therefore, catalysis is thought to be also useful as a tool for reduction of the energies needed for $CO_2$ desorption during amine based $CO_2$ separation processes.

Kinetics of the decomposition of $NaHCO_3$ supported on a nanoporous $TiO(OH)_2$ was compared with that of pure $NaHCO_3$. It was shown that by supporting the $NaHCO_3$ on $TiO(OH)_2$, the activation energy of $NaHCO_3$ decreased significantly and in one example from 75 kJ/mol to 36 kJ/mol. Although the frequency factors of the Arrhenius form of the decomposition of $NaHCO_3$ in NHT samples dropped significantly due to the decrease of $NaHCO_3$ concentration in solid, the large reduction in activation energy increased the rate constant by more than a factor of ten for some NHT samples. NHT was shown to be thermally stable in the studied temperature range based on the characterization results of FT-IR, SEM, and XRD for fresh and used NHT. In other words, the catalytic support material $TiO(OH)_2$ has a large potential to reduce the energy needed for $CO_2$ desorption when $Na_2CO_3$ is used for $CO_2$ sorption, or the overall cost of a $Na_2CO_3$/$NaHCO_3$ based $CO_2$ separation process, since the expenses incurred during $CO_2$ desorption steps account for the major part of the cost of most of the $CO_2$ capture technologies.

The inventions and methods described herein can be viewed as a whole, or as a number of separate inventions that can be used independently or mixed and matched as desired. All inventions, steps, processes, devices, and methods described herein can be mixed and matched as desired. All previously described features, functions, or inventions described herein or by reference may be mixed and matched as desired.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A catalyst composition for adsorption or desorption of carbon dioxide ($CO_2$), comprising:
   MOOH, where M is a trivalent metallic cation comprises $Fe^{3+}$; and
   at least one of $NaHCO_3$ and $Na_2CO_3$ including a purity in a range from about 80% to about 100%, wherein the MOOH is nanoporous and a portion of at least one of $NaHCO_3$ and $Na_2CO_3$ arranged on said MOOH, wherein the desorption of carbon dioxide is according to equation:

$$Na_2CO_3 + CO_2 + H_2O \xleftrightarrow{MOOH} 2NaHCO_3,$$

wherein the MOOH is a catalyst and supporting material for increasing a surface area of $NaHCO_3$ and $Na_2CO_3$.

2. The catalyst of claim 1, further comprising $TiO(OH)_2$.

3. The catalyst of claim 1, further comprising $NO(OH)_2$, wherein $NO(OH)_2$ comprises the catalyst, where N is a tetravalent cation selected from a group consisting of $Ti^{4+}$ and $Ce^{4+}$.

4. The catalyst of claim 1, wherein a weight percent of $NaHCO_3$/MOOH is in a range from about 20 wt % to about 95 wt %.

5. The catalyst of claim 3, wherein a weight percent of $Na_2CO_3$/MOOH is in a range from about 20 wt % to about 95 wt %.

6. A catalyst composition for adsorption or desorption of carbon dioxide ($CO_2$), comprising:
   $NO(OH)_2$, where N is a tetravalent metallic cation selected from a group consisting of $Ti^{4+}$ and $Ce^{4+}$, wherein the $NO(OH)_2$ is a nanoporous amorphous structure; and
   at least one of $NaHCO_3$ and $Na_2CO_3$, wherein said $NaHCO_3$ has a purity in a range from about 80% to about 100% and is arranged on the $NO(OH)_2$, wherein the adsorption and desorption of carbon dioxide is according to equation:

$$Na_2CO_3 + CO_2 + H_2O \xleftrightarrow{NO(OH)_2} 2NaHCO_3,$$

wherein the $NO(OH)_2$ is a catalyst and supporting material for increasing a surface area of $NaHCO_3$ and $Na_2CO_3$.

7. The catalyst of claim 6, wherein the weight percent of $NaHCO_3$/$NO(OH)_2$ was in a range from about 20 wt % to about 95 wt %.

8. A catalyst composition for desorption of carbon dioxide ($CO_2$), comprising:
   a nanoporous amorphous $TiO(OH)_2$ substrate; and
   at least one of $NaHCO_3$ and $Na_2CO_3$ arranged on the nanoporous substrate, wherein the desorption of carbon dioxide ($CO_2$) is according to equation:

$$Na_2CO_3 + CO_2 + H_2O \xleftrightarrow{TiO(OH)_2} 2NaHCO_3,$$

wherein the $TiO(OH)_2$ is a catalyst and supporting material for increasing a surface area of $NaHCO_3$ and $Na_2CO_3$.

9. The catalyst of claim 1, wherein an activation energy of a $CO_2$ desorption is reduced in a range from about 5% to about 50% as compared to $CO_2$ desorption without the catalyst.

10. The catalyst of claim 1, wherein an activation energy of a $CO_2$ desorption is reduced in a range from about 25% to about 45% as compared to $CO_2$ desorption without the catalyst.

11. A catalyst composition for $CO_2$ desorption from a bicarbonate, comprising: $NO(OH)_2$, where N is a tetravalent metallic cation and wherein $NO(OH)_2$ has a nanoporous amorphous structure; and
   MOOH, where M is a trivalent metallic cation and wherein MOOH has a nanoporous structure, wherein the MOOH and $NO(OH)_2$ are each a catalyst and supporting material for increasing a surface area of the bicarbonate.

12. The catalyst of claim 11, wherein the bicarbonate is selected from group consisting of $NaHCO_3$ and $KHCO_3$.

13. The catalyst of claim 11, wherein the trivalent metallic cation is selected from a group consisting of $Fe^{3+}$ and $Al^{3+}$.

14. The catalyst of claim 11, wherein the tetravalent metallic cation is selected from group consisting of $Ti^{4+}$ and $Ce^{4+}$.

15. A method of $CO_2$ adsorption and desorption, comprising the steps of:

adsorption and desorption of $CO_2$ utilizing a catalyst composition, the catalyst composition comprising:

$NO(OH)_2$, wherein N is a tetravalent metallic cation; and $Na_2CO_3$ and $NaHCO_3$, wherein the adsorption and desorption of $CO_2$ is according to equation:

$$Na_2CO_3 + CO_2 + H_2O \xleftrightarrow{NO(OH)_2} 2NaHCO_3,$$

wherein the $NO(OH)_2$ is the catalyst and a nanoporous amorphous supporting material for increasing a surface area of $Na_2CO_3$ and $NaHCO_3$.

16. The method of claim 15, wherein the tetravalent metallic cation is $Ti^{4+}$.

17. The method of claim 15, wherein the tetravalent metallic cation is $Ce^{4+}$.

18. The method of claim 15, wherein the $CO_2$ is from a flue gas of a coal fired plant.

19. The method of claim 15, wherein the catalyst further comprises MOOH, where M is a trivalent metallic cation.

20. The method of claim 19, wherein the trivalent metallic cation is selected from group consisting of $Fe^{3+}$, $Al^{3+}$ and combinations thereof.

* * * * *